US009363736B2

(12) United States Patent
Griot et al.

(10) Patent No.: US 9,363,736 B2
(45) Date of Patent: Jun. 7, 2016

(54) METHODS AND APPARATUS FOR PROVISIONING OF CREDENTIALS IN NETWORK DEPLOYMENTS

(71) Applicant: QUALCOMM Incorporated, San Diego, CA (US)

(72) Inventors: Miguel Griot, La Jolla, CA (US); Gavin Bernard Horn, La Jolla, CA (US); Anand Palanigounder, San Diego, CA (US); Kalle Ilmari Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/528,848

(22) Filed: Oct. 30, 2014

(65) Prior Publication Data
US 2015/0172997 A1 Jun. 18, 2015

Related U.S. Application Data

(60) Provisional application No. 61/916,580, filed on Dec. 16, 2013.

(51) Int. Cl.
H04M 1/66 (2006.01)
H04M 1/68 (2006.01)
(Continued)

(52) U.S. Cl.
CPC ............. *H04W 48/08* (2013.01); *H04L 63/10* (2013.01); *H04L 63/205* (2013.01); *H04W 12/04* (2013.01); *H04W 12/08* (2013.01); *H04W 74/08* (2013.01); *H04W 4/001* (2013.01)

(58) Field of Classification Search
CPC ...... H04W 48/08; H04W 12/04; H04W 12/08; H04W 74/08; H04W 4/005; H04W 4/001; H04L 63/205; H04L 63/10
See application file for complete search history.

(56) References Cited

U.S. PATENT DOCUMENTS

2007/0297367 A1 12/2007 Wang et al.
2010/0159899 A1* 6/2010 Horn .................. H04L 63/10
455/414.1

(Continued)

FOREIGN PATENT DOCUMENTS

WO WO-2009/092115 A2 7/2009
WO WO-2011/100331 A1 8/2011
WO WO-2013/039900 A1 3/2013

OTHER PUBLICATIONS

M Pei, : Dynamic Symmetric Key Provisioning Protocol, http://www.ietf.org/internet-drafts/draft-pei-dynamic-symkey-prov-protocol-01.txt, Reference: IETF Network Working Group, Internet Draft 'draft-pei-dynamic-symkey-prov-protocol-01.txt', Oct. 23, 2006.*

(Continued)

Primary Examiner — Erin File
(74) Attorney, Agent, or Firm — Arent Fox LLP

(57) ABSTRACT

A method, an apparatus, and a computer program product for wireless communication in which provisioning of credentials for network deployments are provided. As such, the method, apparatus, and computer program product may provision a user equipment (UE) even though the UE does not have any valid security credentials, so as to provide access to a network (e.g., a network using a contention based frequency band such as a Long Term Evolution (LTE) Advanced network in the contention based radio frequency band). Accordingly, in some aspects, the present method, apparatus, and computer program product may enable the UE to perform a provisioning procedure with one or more network entities to obtain one or more security credential parameters.

114 Claims, 12 Drawing Sheets

(51) Int. Cl.
*H04M 3/16* (2006.01)
*H04W 48/08* (2009.01)
*H04W 12/08* (2009.01)
*H04W 74/08* (2009.01)
*H04L 29/06* (2006.01)
*H04W 12/04* (2009.01)
*H04W 4/00* (2009.01)

(56) References Cited

U.S. PATENT DOCUMENTS

| 2013/0010756 A1* | 1/2013 | Liang | H04W 36/18 370/331 |
| 2013/0115915 A1* | 5/2013 | Tipton | H04W 12/08 455/411 |
| 2013/0305330 A1 | 11/2013 | Palanigounder | |
| 2014/0248868 A1* | 9/2014 | Wang | H04W 12/02 455/422.1 |
| 2015/0223129 A1* | 8/2015 | Liang | H04W 36/0083 370/331 |

OTHER PUBLICATIONS

International Search Report and Written Opinion—PCT/US2014/063484—ISA/EPO—Feb. 11, 2015. (13 total pages).

Haverinen H., et al., "Network Working Group Extensible Authentication Protocol Method for Global System for Mobile Communications (GSM) Subscriber Identity Modules (EAP-SIM)," RFC, Jan. 31, 2006, pp. 1-92, XP055163604.

* cited by examiner

METHODS AND APPARATUS FOR PROVISIONING OF CREDENTIALS IN NETWORK DEPLOYMENTS

CLAIM OF PRIORITY UNDER 35 U.S.C. §119

The present application for patent claims priority to U.S. Provisional Application No. 61/916,580 entitled "METHODS AND APPARATUS FOR PROVISIONING OF CREDENTIALS IN NETWORK DEPLOYMENTS" filed Dec. 16, 2013, assigned to the assignee hereof and hereby expressly incorporated herein by reference.

BACKGROUND

The present disclosure relates generally to communication systems, and more particularly, to provisioning in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, a user equipment (UE) may require access to a specific network (e.g., a network operating in a contention based radio frequency band or spectrum). However, the UE may not have the proper credentials or authorization to access the network over such a band. Thus, improvements in provisioning of appropriate credential or authorization in network deployments are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication includes determining that a provisioning request message received from a user equipment (UE) comprises a request to obtain one or more security credential parameters to access a network; allowing the UE to defer one or more general authentication procedures to grant limited access to the network for the UE based on the request; transmitting the provisioning request message to a registration entity; and receiving a provisioning accept message in response to the registration entity accepting the request to establish a provisioning procedure, wherein the registration entity determines to accept the request to establish the provisioning procedure.

In a further aspect, a computer-readable medium storing computer executable code comprises code for determining that a provisioning request message received from a user equipment (UE) comprises a request to obtain one or more security credential parameters to access a network; code for allowing the UE to defer one or more general authentication procedures to grant limited access to the network for the UE based on the request; code for transmitting the provisioning request message to a registration entity; and code for receiving a provisioning accept message in response to the registration entity accepting the request to establish a provisioning procedure, wherein the registration entity determines to accept the request to establish the provisioning procedure.

In another aspect, an apparatus for wireless communication includes means for determining that a provisioning request message received from a user equipment (UE) comprises a request to obtain one or more security credential parameters to access a network; means for allowing the UE to defer one or more general authentication procedures to grant limited access to the network for the UE based on the request; means for transmitting the provisioning request message to a registration entity; and means for receiving a provisioning accept message in response to the registration entity accepting the request to establish a provisioning procedure, wherein the registration entity determines to accept the request to establish the provisioning procedure.

In a further aspect, an apparatus for wireless communication includes a negotiation component configured to determine that a provisioning request message received from a user equipment (UE) comprises a request to obtain one or more security credential parameters to access a network; an authentication component configured to allow the UE to defer one or more general authentication procedures to grant limited access to the network for the UE based on the request; and a communication component configured to transmit the provisioning request message to a registration entity, wherein the communication component is further configured to receive a provisioning accept message in response to the registration entity accepting the request to establish a provisioning procedure, wherein the registration entity determines to accept the request to establish the provisioning procedure.

In another aspect of the disclosure, a method of wireless communication includes receiving a provisioning request message from a user equipment (UE); determining that the provisioning request message comprises a request to establish a provisioning procedure to obtain one or more security credential parameters to access a network; and establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

In a further aspect, a computer-readable medium storing computer executable code comprises code for receiving a provisioning request message from a user equipment (UE); code for determining that the provisioning request message comprises a request to establish a provisioning procedure to obtain one or more security credential parameters to access a network; and code for establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

In another aspect, an apparatus for wireless communication includes means for receiving a provisioning request message from a user equipment (UE); means for determining that the provisioning request message comprises a request to establish a provisioning procedure to obtain one or more security credential parameters to access a network; and means for establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

Moreover, in an aspect, an apparatus for wireless communication includes a communication component configured to receive a provisioning request message from a user equipment (UE); a negotiation component configured to determine that the provisioning request message comprises a request to establish a provisioning procedure to obtain one or more security credential parameters to access a network; and an authentication component configured to establish a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

Further, in an aspect of the disclosure, a method of wireless communication includes establishing a unauthenticated session with a first network entity, wherein the unauthenticated session provides temporary access to a network for performing a provisioning procedure to obtain one or more security credential parameters to access the network; negotiating one or more provisioning parameters with second network entity of the network in response to establishing the unauthenticated session with the first network entity; and performing the provisioning procedure based at least in part on the one or more provisioning parameters.

In another aspect, a computer-readable medium storing computer executable code comprises code for establishing a unauthenticated session with a first network entity, wherein the unauthenticated session provides temporary access to a network for performing a provisioning procedure to obtain one or more security credential parameters to access the network; code for negotiating one or more provisioning parameters with second network entity of the network in response to establishing the unauthenticated session with the first network entity; and code for performing the provisioning procedure based at least in part on the one or more provisioning parameters.

In a further aspect, an apparatus for wireless communication includes means for establishing a unauthenticated session with a first network entity, wherein the unauthenticated session provides temporary access to a network for performing a provisioning procedure to obtain one or more security credential parameters to access the network; means for negotiating one or more provisioning parameters with second network entity of the network in response to establishing the unauthenticated session with the first network entity; and means for performing the provisioning procedure based at least in part on the one or more provisioning parameters.

Moreover, in an aspect, an apparatus for wireless communication includes an unauthenticated component configured to establish a unauthenticated session with a first network entity, wherein the unauthenticated session provides temporary access to a network for performing a provisioning procedure to obtain one or more security credential parameters to access the network; a negotiation component configured to negotiate one or more provisioning parameters with second network entity of the network in response to establishing the unauthenticated session with the first network entity; and a procedure component configured to perform the provisioning procedure based at least in part on the one or more provisioning parameters.

Additionally, in an aspect of the disclosure, a method of wireless communication includes establishing a unauthenticated session with a first network entity of a first network, wherein the unauthenticated session provides temporary access to the first network for performing a provisioning procedure to obtain one or more security credential parameters to access the first network; negotiating one or more provisioning parameters with a second network entity of the first network in response to establishing the unauthenticated session with the first network entity; receiving one or more offline provisioning parameters from the second network entity based at least in part on negotiating the one or more provisioning parameters; releasing the unauthenticated session with the first network entity in response to receiving the one or more offline provisioning parameters; and performing offline provisioning with a third network entity of a second network; wherein the offline provisioning comprises receiving one or more security credential parameters for providing secure access to the first network, wherein the one or more security credential parameters provide unrestricted access to the first network.

In another aspect, a computer-readable medium storing computer executable code comprises code for establishing a unauthenticated session with a first network entity of a first network, wherein the unauthenticated session provides temporary access to the first network for performing a provisioning procedure to obtain one or more security credential parameters to access the first network; code for negotiating one or more provisioning parameters with a second network entity of the first network in response to establishing the unauthenticated session with the first network entity; code for receiving one or more offline provisioning parameters from the second network entity based at least in part on negotiating the one or more provisioning parameters; code for releasing the unauthenticated session with the first network entity in response to receiving the one or more offline provisioning parameters; and code for performing offline provisioning with a third network entity of a second network; wherein the offline provisioning comprises receiving one or more security credential parameters for providing secure access to the first network, wherein the one or more security credential parameters provide unrestricted access to the first network.

In a further aspect, an apparatus for wireless communication includes means for establishing a unauthenticated session with a first network entity of a first network, wherein the unauthenticated session provides temporary access to the first network for performing a provisioning procedure to obtain one or more security credential parameters to access the first network; means for negotiating one or more provisioning parameters with a second network entity of the first network in response to establishing the unauthenticated session with the first network entity; means for receiving one or more offline provisioning parameters from the second network entity based at least in part on negotiating the one or more provisioning parameters; means for releasing the unauthenticated session with the first network entity in response to receiving the one or more offline provisioning parameters; and means for performing offline provisioning with a third network entity of a second network; wherein the offline provisioning comprises receiving one or more security credential parameters for providing secure access to the first network, wherein the one or more security credential parameters provide unrestricted access to the first network.

In an additional aspect, an apparatus for wireless communication includes an authentication component configured to establish a unauthenticated session with a first network entity of a first network, wherein the unauthenticated session provides temporary access to the first network for performing a provisioning procedure to obtain one or more security credential parameters to access the first network; a negotiation component configured to negotiate one or more provisioning parameters with a second network entity of the first network in response to establishing the unauthenticated session with the first network entity; a communication component configured to receive one or more offline provisioning parameters from the second network entity based at least in part on negotiating the one or more provisioning parameters; wherein the authentication component is further configured to release the unauthenticated session with the first network entity in response to receiving the one or more offline provisioning parameters; and a procedure component configured to perform offline provisioning with a third network entity of a second network; wherein the offline provisioning comprises receiving one or more security credential parameters for providing secure access to the first network, wherein the one or more security credential parameters provide unrestricted access to the first network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals, and where dashed lines may indicate optional components or actions. These drawings should not be construed as limiting the present disclosure, but are intended to be illustrative only.

DETAILED DESCRIPTION

Figure 1:
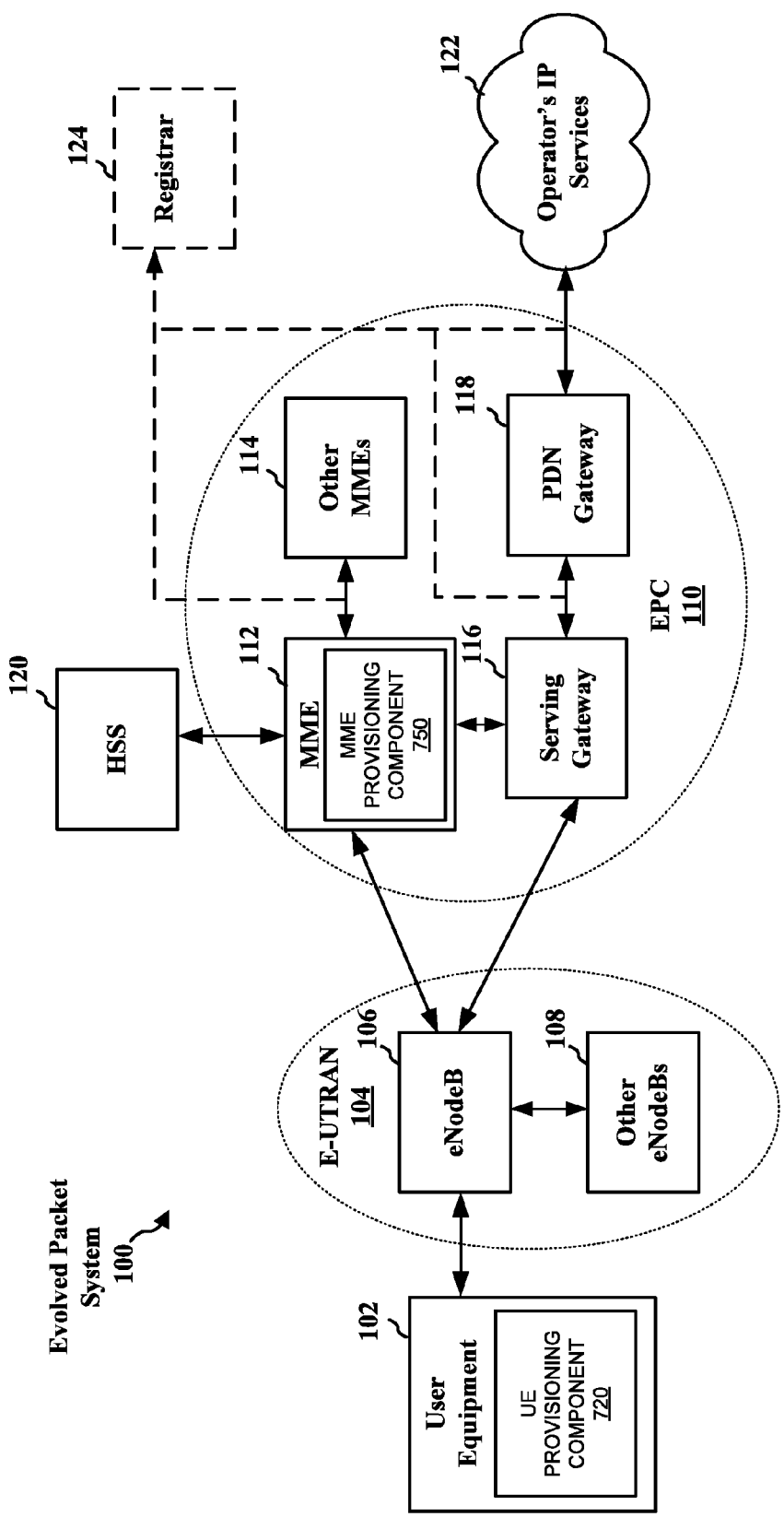
FIG. 1 is a diagram illustrating an example of a network architecture according to an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present aspects generally relate to performing a provisioning procedure in wireless communication systems. Specifically, in some wireless communication systems, network entities may provide coverage on a specific network (e.g., a network using a contention based frequency band). Accordingly, a UE may require access to the specific network. However, the UE may not have the proper credentials or authorization to access the network. As such, the UE may be prevented from accessing the desired network.

As such, the present methods and apparatus may provision the UE even though the UE does not have any valid security credentials, so as to provide access to a network (e.g., a network using a contention based frequency band such as a Long Term Evolution (LTE) Advanced network in the contention based radio frequency band). Accordingly, in some aspects, the present methods and apparatus may provide an efficient solution, as compared to the current solutions, to enable the UE to perform a provisioning procedure with one or more network entities to obtain one or more security credential parameters.

FIG. 1 is a diagram illustrating an LTE network architecture 100. The LTE network architecture 100 may be referred to as an Evolved Packet System (EPS) 100. The EPS 100 may include one or more user equipment (UE) 102 which may include UE provisioning component 720 (FIG. 7) configured to provision the UE with a desired network. Additionally, EPS 100 may include an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112 which may include MME provisioning component 750 (FIG. 7) configured to provision the UE with the desired network. Additionally, EPC 110 may include other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Additionally, the EPS 100 may include Registrar 124 connected to EPC 110. Registrar 124 may be configured to perform provisioning procedures for one or more UEs (e.g., UE 102), so as to control access to a particular network (e.g., EPC 110). Registrar 124 may be internal or external to EPC 110, and may be configured to connect with Serving Gateway 116 and/or PDN Gateway 118. Further, Registrar 124 may be connected to MME 112 and/or Other MMEs 114.

The UE 102 may be configured to communicate with the E-UTRAN 104 using one or both of a first band or spectrum and a second band or spectrum. The second band may, in some instances, comprise a contention based radio frequency band. In some aspects, the first band may correspond to a band within a licensed spectrum and the second band may correspond to a band within an unlicensed spectrum.

Figure 2:
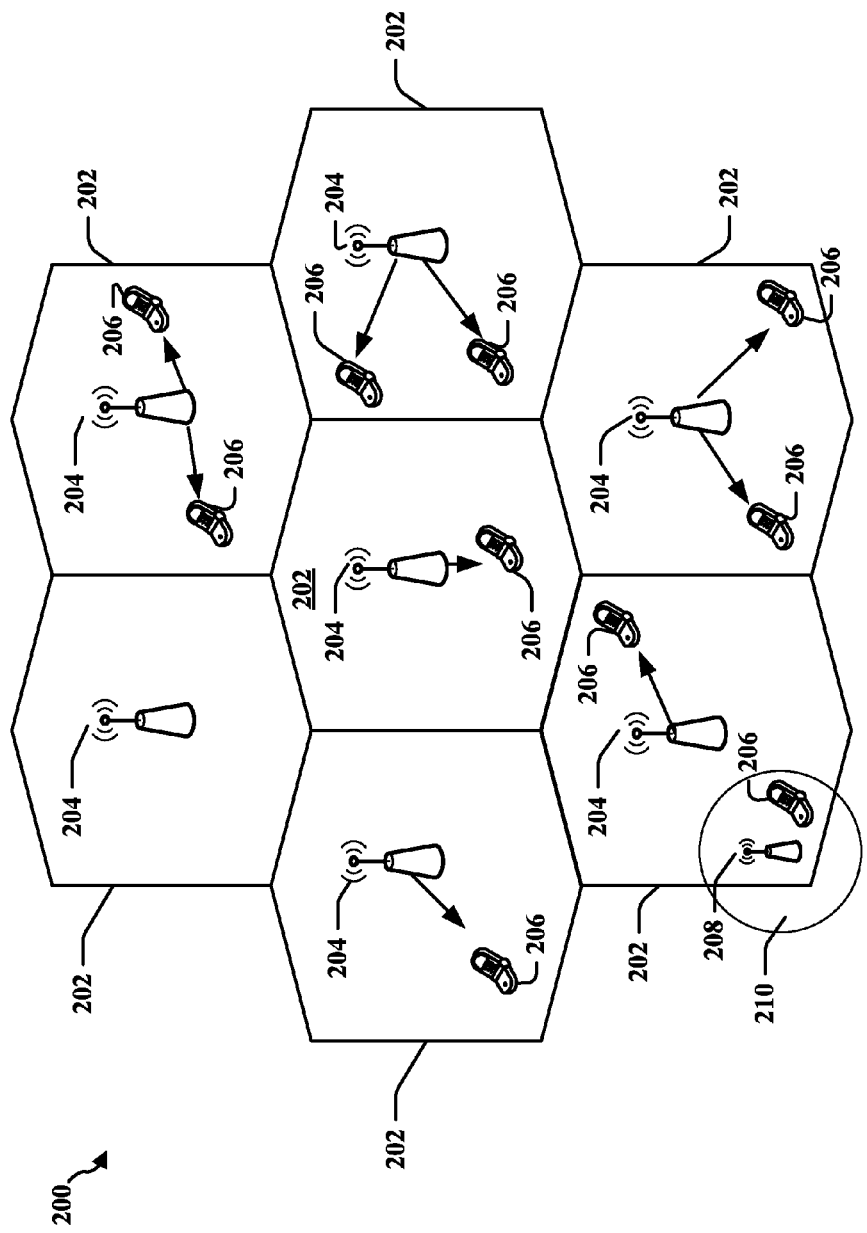
FIG. 2 is a diagram illustrating an example of an access network according to an aspect of the present disclosure.

FIG. 2 is a diagram illustrating an example of an access network 200 in an LTE network architecture in which one or more UEs 206 may each include UE provisioning component 720 (FIG. 7), as described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 (and to MMEs, such as MME 112 of FIG. 1 which may include MME provisioning component 750 (FIG. 7), as described herein) for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
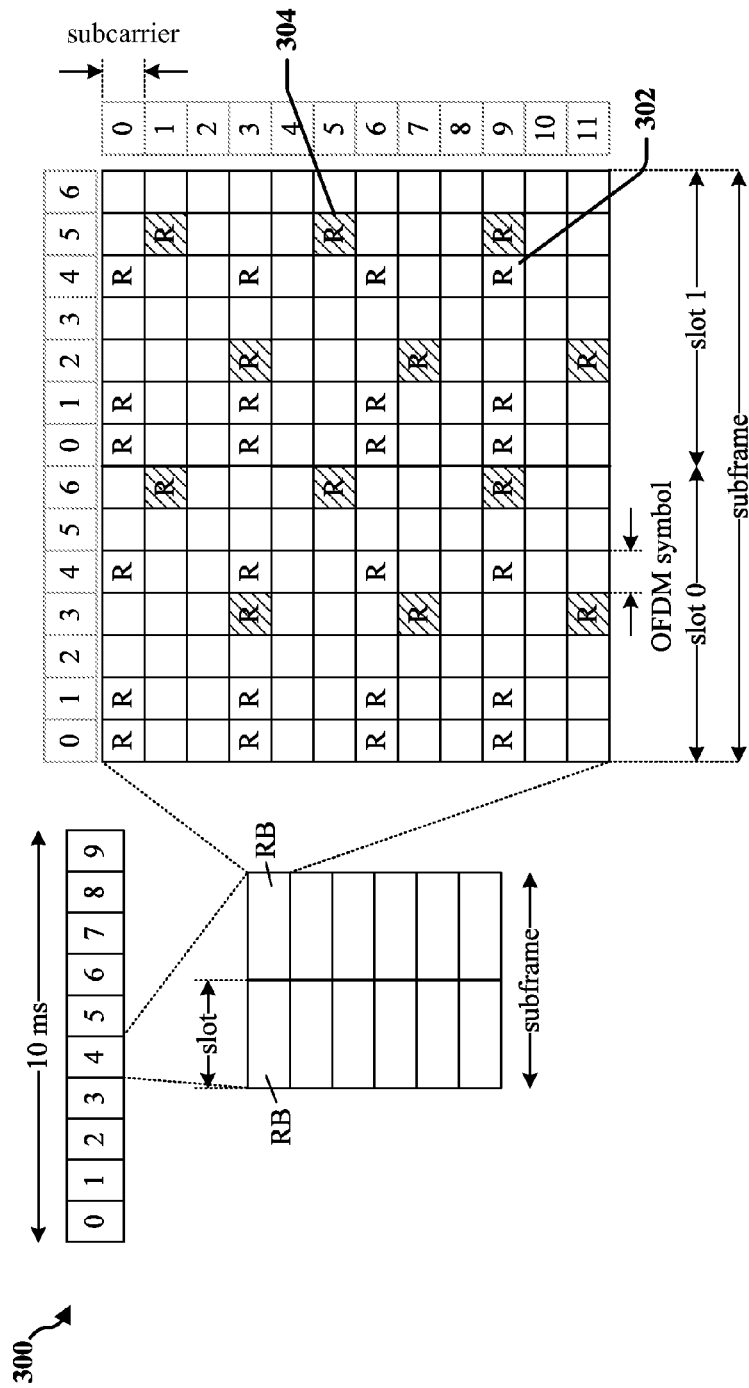
FIG. 3 is a diagram illustrating an example of a DL frame structure in LTE according to an aspect of the present disclosure.

FIG. 3 is a diagram 300 illustrating an example of a DL frame structure in LTE, which may be received by a UE, such as UE 702 (FIG. 7) that includes UE provisioning component 720 (FIG. 7), as described herein; and which may be transmitted by a MME, such as MME 112 which may include MME provisioning component 750 (FIG. 7), as described herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
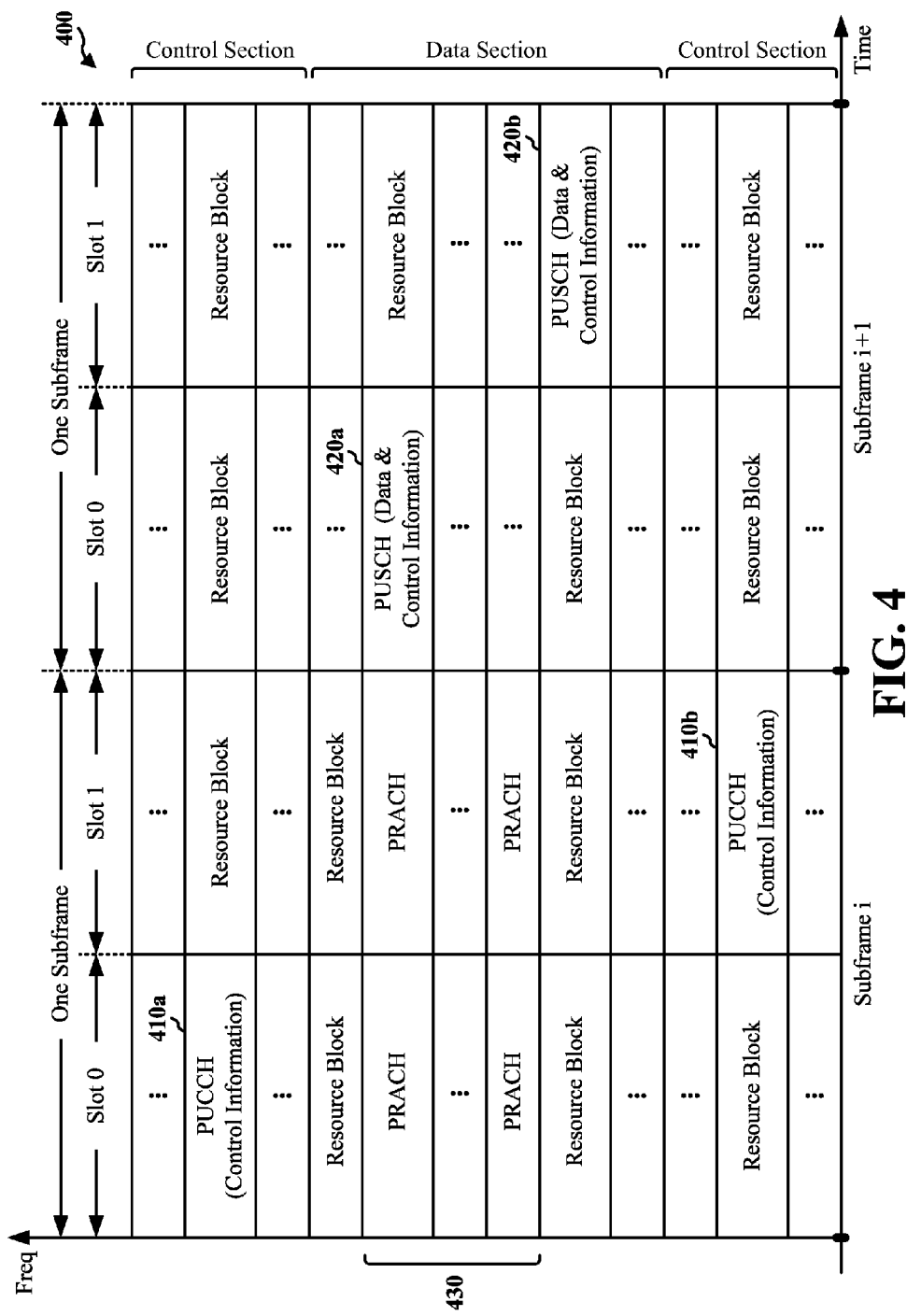
FIG. 4 is a diagram illustrating an example of an UL frame structure in LTE according to an aspect of the present disclosure.

FIG. 4 is a diagram 400 illustrating an example of an UL frame structure in LTE, which may be transmitted by a UE, such as UE 702 (FIG. 7) that includes UE provisioning component 720 (FIG. 7), as described herein; and which may be received by a MME, such as MME 112 which may include MME provisioning component 750 (FIG. 7), as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 702 (FIG. 7) including UE provisioning component 720, may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
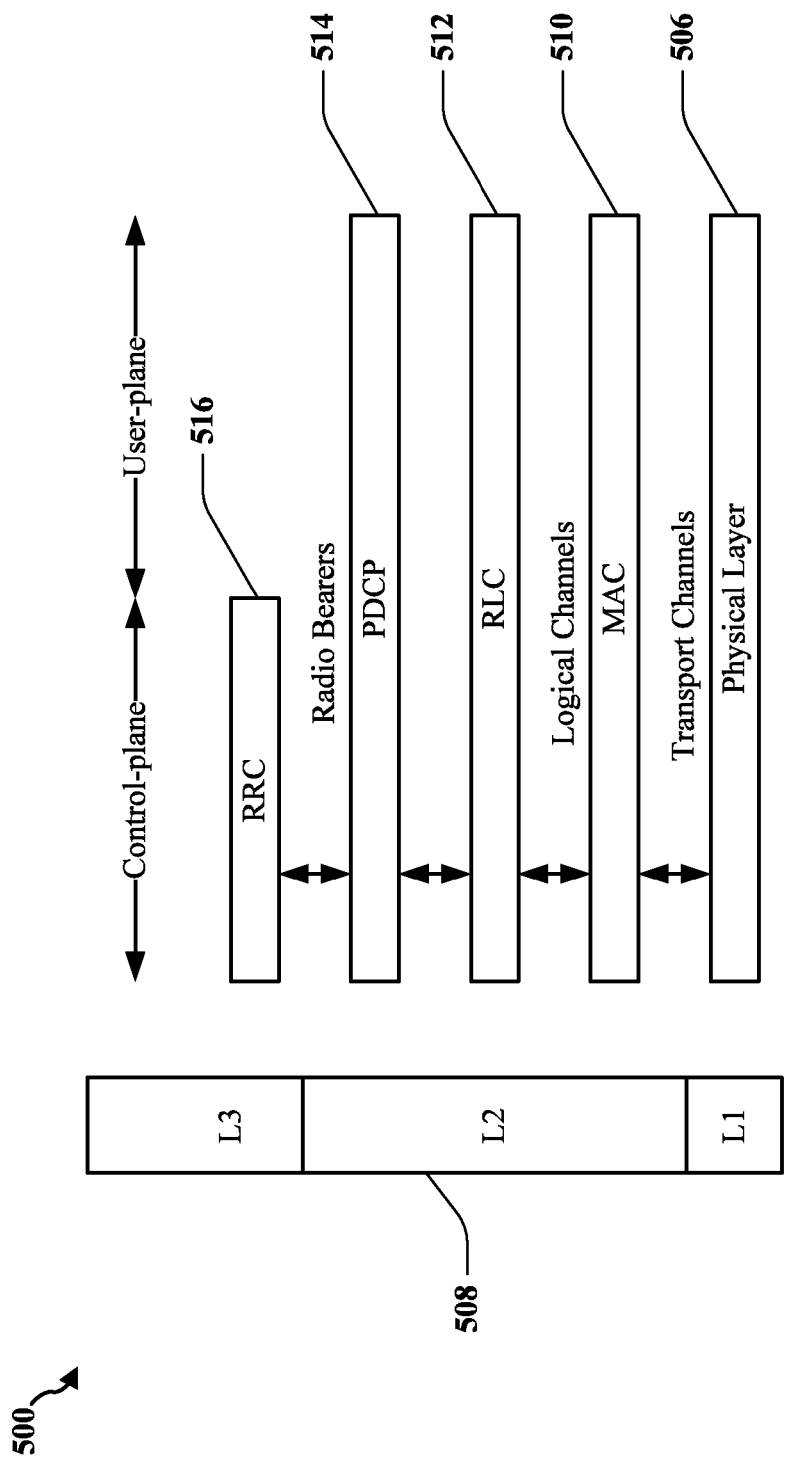
FIG. 5 is a diagram illustrating an example of a radio protocol architecture for the user and control planes according to an aspect of the present disclosure.

FIG. 5 is a diagram 500 illustrating an example of a radio protocol architecture for the user and control planes in LTE. The radio protocol architecture may be used by a UE, such as UE 702 (FIG. 7) including UE provisioning component 720, and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
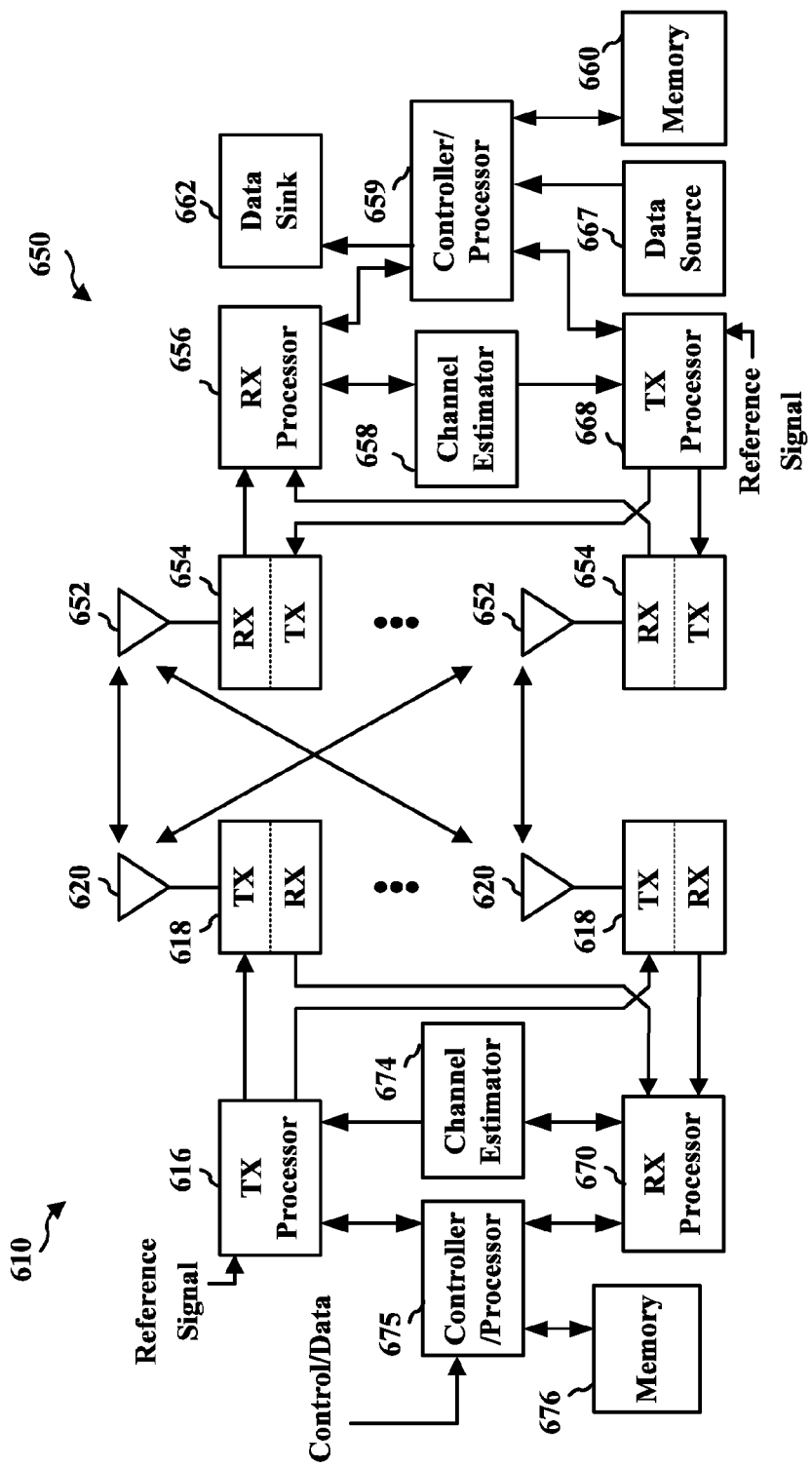
FIG. 6 is a diagram illustrating an example of an evolved Node B and user equipment in an access network according to an aspect of the present disclosure.

FIG. 6 is a block diagram of an eNB 610 in communication with a UE 650 in an access network. UE 650 may be the same or similar as UE 702 including UE provisioning component 720 of FIG. 7, as described herein. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
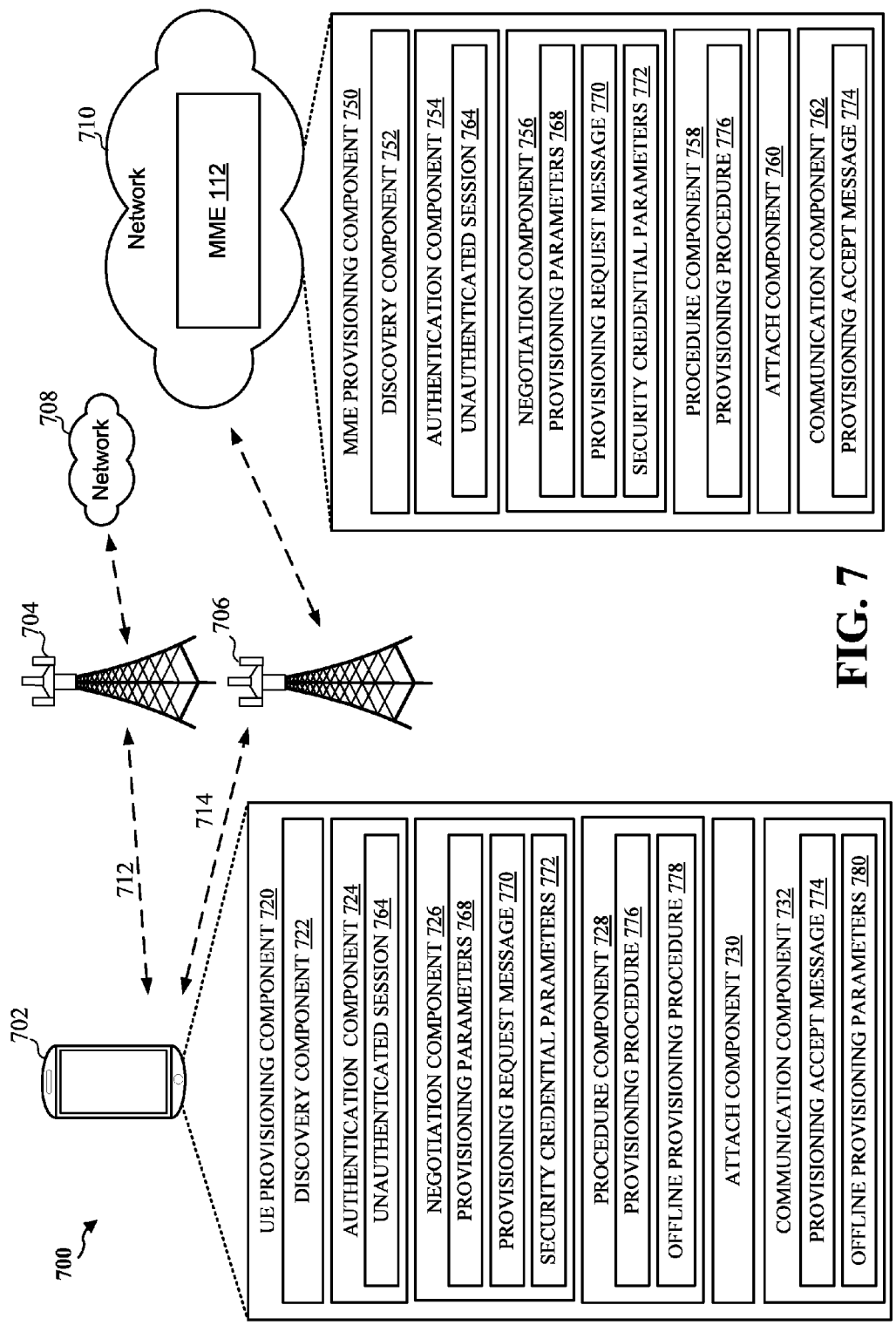
FIG. 7 is a schematic diagram of a communication network including an aspect of a UE and a network entity that may perform a provisioning procedure.

Referring to FIG. 7, in an aspect, a wireless communication system 700 includes at least one UE 702 in communication coverage of at least a first network entity 704 and a second network entity 706. UE 702 may communicate with first network 708 via first network entity 704. UE 702 may communicate with second network 710 and MME 112 via second network entity 706. In some aspects, multiple UEs including UE 702 may be in communication coverage with one or more network entities, including first network entity 704 and second network entity 706. For instance, UE 702 may communicate with first network entity 704 on or using one or more communication channels 712 on the licensed spectrum. Further, for example, UE 702 may communicate with second network entity 706 on or using one or more communication channels 714 on the contention based radio frequency band.

It should be understood that UE 702 may communicate with one or more cells included or deployed at one or both first network entity 704 and second network entity 706. That is, UE 702 may select or reselect from one cell at first network entity 704 to another cell at first network entity 704. In other aspects, first network entity 704 may alternatively be referred to as a first cell with which UE 702 maintains an RRC connected state. Additionally, UE 702 may transmit and/or receive wireless communication to and/or from first network entity 704 and/or second network entity 706. For example, such wireless information may include, but is not limited to, information related to the provisioning of the UE 702 to a network using contention based radio frequency band (e.g., second network 710).

In some aspects, UE 702 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, or some other suitable terminology.

Additionally, first network entity 704 and second network entity 706 may be a macrocell, picocell, femtocell, access point, relay, Node B, mobile Node B, UE (e.g., communicating in peer-to-peer or ad-hoc mode with UE 702), or substantially any type of component that can communicate with UE 702 to provide wireless network access at the UE 12.

According to the present aspects, UE 702 may include UE provisioning component 720, which may be configured to provision UE 702 with security credential parameters 772 for accessing a network (e.g., second network 710) for which the UE 702 does not have any valid security credentials. For instance, a network where UE 702 may not initially have valid security credentials may include, but is not limited to, a network using a contention based frequency band such as a Long Term Evolution (LTE) Advanced network in the contention based radio frequency band. For example, UE provisioning component 720 may establish a unauthenticated session 764 with a network entity (e.g., second network entity 706), wherein the unauthenticated session 764 provides temporary access to a network (e.g., second network 710) for performing a provisioning procedure 776 to obtain one or more security credential parameters 772 to access the network (e.g., second network 710); negotiating one or more provisioning parameters 768 with another network entity (e.g., MME 112) of the network (e.g., second network 710) in response to establishing the unauthenticated session 764 with the network entity (e.g., second network entity 706); and performing the provisioning procedure 776 based at least in part on the one or more provisioning parameters 768.

Further, UE provisioning component 720 may establish a unauthenticated session 764 with a network entity (e.g., second network entity 706) of a network (e.g., second network 710), wherein the unauthenticated session 764 provides temporary access to the network (e.g., second network 710) for performing a provisioning procedure 776 to obtain one or more security credential parameters 772 to access the network (e.g., second network 710); negotiate one or more provisioning parameters 768 with another network entity (e.g., MME 112) of the network (e.g., second network 710) in response to establishing the unauthenticated session 764 with the network entity (e.g., second network entity 706); receive one or more offline provisioning parameters 780 from the second network entity (e.g., MME 112) based at least in part on negotiating the one or more provisioning parameters 768; release the unauthenticated session 764 with the network entity (e.g., second network entity 706) in response to receiving the one or more offline provisioning parameters 780; and perform offline provisioning with a different network entity (e.g., first network entity 704) of a different network (e.g., first network 708); wherein the offline provisioning comprises receiving one or more security credential parameters 772 for providing secure access to the network (e.g., second network 710), wherein the one or more security credential parameters 772 provide unrestricted access to the network (e.g., second network 710).

In an aspect, UE provisioning component may include discovery component 722, which may be configured to discover one or more networks available for provisioning. The discovery procedure may be initiated by the UE (e.g., UE 702) or by the network (e.g., Registrar 124 of FIG. 1). For example, during UE initiated discovery, discovery component 722 may be configured to scan one or more networks (e.g., first network 708 and second network 710). In some instances, discovery component 722 may scan networks using either the contention based radio frequency band (e.g., second network 710) or a licensed radio frequency band (e.g., first network 708). Further, discovery component 722 determines that at least one of the one or more networks (e.g., second network 710) is available for provisioning. Once, one of the one or more networks (e.g., second network 710) are determined to be available, discovery component 722 may select the one of the one or more networks. The one of the one or more networks (e.g., second network 710) may be selected based on user input or via application. As such, once a network (e.g., second network 710) is selected, a provisioning procedure 776 type (PPT) and one or more PPT parameters are provided for the one of the one or more networks selected.

Moreover, during network (e.g., Registrar 124 of FIG. 1) initiated discovery, discovery component 722 may be configured to receive one or more broadcast messages. For example, discovery component 722 may receive the one or more broadcast messages via communication channels 712 and/or 714. The broadcast messages may comprise a provisioning procedure 776 type (PPT) and one or more PPT parameters for one or more networks. Additionally, the broadcast messages may be transmitted as System Information Block (SIB) messages via communication channels 712 and/or 714. As a result, discovery component may select one of the one or more networks. The one of the one or more networks (e.g., second network 710) may be selected based on user input or via application. As a result of performing the discovery procedure, UE 702 obtains the PPT and PPT parameters required for performing the provisioning procedure 776.

In additional aspects, UE provisioning component 720 may include authentication component 724 which may be configured to establish a unauthenticated session 764 with a second network entity 706 of the selected second network 710. For example, authentication component 724 may be configured to establish a unauthenticated session 764 based at least in part on the PPT and PPT parameters obtained during the discovery procedure in with UE 702 indicates during establishing the unauthenticated session 764. In some aspects, the unauthenticated session 764 may be a Radio Resource Control (RRC) connection between the UE 702 and the second network entity 706. Further, the unauthenticated session 764 provides temporary access to the second network 710 for performing a provisioning procedure 776 to obtain one or more security credential parameters 772 to access the second network 710. In response to performing the provisioning procedure 776, authentication component 724 may release the unauthenticated session 764 with a second network entity 706 of the selected second network 710.

UE provisioning component 720 may include negotiation component 726, which may be configured to negotiate one or more provisioning parameters 768 (e.g., PPT and PPT parameters) with MME 112 of the second network 710 in response to establishing the unauthenticated session 764 with the second network entity 706. For example, negotiating the one or more provisioning parameters 768 may comprise negotiation component 726 transmitting a provisioning request message 770 via communication channel 114 to MME 112. The provisioning request message 770 may comprise a request to establish a provisioning procedure 776 for second network 710. As such, negotiation component 726 receiving a provisioning accept message 774 in response to the MME 112 accepting the provisioning request. As a result of receiving the provisioning accept message 774, negotiation component 726 may attach with MME 112 and have restricted access to one or more gateways (e.g., serving gateway 116 and/or PDN gateway 118) for the purposes of performing the provisioning procedure 776 only (e.g., UE 702 may not have access to the Internet via second network 710).

In some aspects, negotiation component 726 may be configured to receive one or more offline provisioning parameters 780 from MME 112 based at least in part on negotiating the one or more provisioning parameters 768. For example, the network (e.g., MME 112) may determine that offline provisioning is required, and so, may transmit one or more offline provisioning parameters 780 to negotiation component 726. In certain instances, the one or more offline provisioning parameters 780 may be received via broadcasted information, or by establishing a unauthenticated session 764 with second network entity 706, and received from MME 112 via unicast signaling.

Further, the provisioning request message 770 may comprise a specific international mobile subscriber identity (IMSI) and/or an access point name (APN). The provisioning request message 770 may also comprise an attach request, wherein the attach request is received over a non-access stratum (NAS) layer. Additionally, a packet data network (PDN) connection request message may be transmitted along with the provisioning request message 770. Negotiation component 726 may receive additional connection information regarding how to connect with Registrar 124 (FIG. 1) to perform the provisioning procedure 776. The additional connection information may comprise an internet protocol (IP) address of Registrar 124 (FIG. 1). Moreover, negotiation component 726 may perform a server look up to search for the IP address of Registrar 124 (FIG. 1) if additional connection information is not received.

In another aspect, UE provisioning component 720 may include procedure component 728, which may be configured to perform the provisioning procedure 776 based at least in part on the one or more provisioning parameters 768 (e.g., PPT and PPT parameters). For example, procedure component 728 may be configured to perform a number of provisioning procedure 776s including inline provisioning and offline provisioning. Inline provisioning may be performed over either the data plane or control plane.

During inline provisioning over the data plane, procedure component 728 may be configured to connect with Registrar 124 (FIG. 1) via establishing a Hypertext Transfer Protocol Secure (HTTPS) session. In an optional aspect, UE 702 and/or procedure component 728 may interact with the user. For example, the user may be required to accept the terms and conditions of the second network 710, enter credit card information and accept payment, choose connectivity options, and/or provide a pass code. In a further aspect, procedure component 728 may interact with Registrar 124 (FIG. 1), such as, by transmitting messages and receiving response as part of the provisioning procedure 776. As a result, procedure component 728 may receive one or more security credential parameters 772 from Registrar 124 (FIG. 1) to use for attaching to network 710 without any network restrictions.

Moreover, during inline provisioning over the control plane, procedure component 728 may be configured to perform a provisioning procedure 776 with MME 112. For example, procedure component 728 may be configured to perform the provisioning procedure 776 over an Extensible Authentication Protocol (EAP) session, WiFi Protected Setup (WPS), or WiFi Protected Access (WPA). As such, procedure component 728 may transmit one or more response messages corresponding to the one or more request messages received from MME 112. The one or more response and request messages may comprise one or more generic non-access stratum transport (GNT) EAP messages. As a result of performing the provisioning procedure 776, procedure component 728 may receive one or more security credential parameters 772 from MME 112. Procedure component 728 may store the one or more security credential parameters 772.

Additionally, during offline provisioning, procedure component 728 may be configured to perform a provisioning procedure 776 with a first network 708 via a first network entity 704 for provisioning UE 702 for network 710. For example, procedure component 728 may be configured to perform a provisioning procedure 776 in first network 708 in response to negotiation component 726 receiving one or more offline provisioning parameters 780 from MME 112 based at least in part on negotiating the one or more provisioning parameters 768. As a result, procedure component 728 may receive one or more security credential parameters 772 to use during attachment with second network 710 for unrestricted access. Further, prior to procedure component 728 performing the offline provisioning procedure 778, authentication component 724 may release the unauthenticated session 764 with second network entity 706.

In an aspect, UE provisioning component 720 may include attach component 730, which may be configured to attaching with MME 112 based at least part on the one or more security credential parameters 772. For example, once procedure component 728 receives the one or more security credential parameters 772 during the offline provisioning procedure 778 attach component 730 may attach with MME 112 using the security credential parameters 772. As a result, MME 112 provides unrestricted access to the network.

UE provisioning component 720 may include communication component 732, which may be configured to permit or otherwise enable uplink and downlink communication. For example, communication component 732 may be configured to communicate the messages to and from UE provisioning component 720 and/or its one or more components (e.g., components 722, 724, 726, 728, and 730).

According to the present aspects, MME 112 may include MME provisioning component 750, which may be configured to provision a UE (e.g., UE 702) for security credential parameters 772 for a network (e.g., second network 710). For example, UE provisioning component 720 may determine that a provisioning request message 770 received from a UE (e.g., UE 702) comprises a request to obtain one or more security credential parameters 772 to access a network (e.g., second network 710); suppress one or more security credential settings of the network (e.g., second network 710) in response to determining the provisioning request comprises the request; and accept the request, wherein accepting the request comprises restricting a packet data context to obtaining the one or more security credential parameters 772.

Further, MME provisioning component 750 may receive a provisioning request message 770 from a UE (e.g., UE 702); determine that the provisioning request message 770 comprises a request to establish a provisioning procedure 776 to obtain one or more security credential parameters 772 to access a network (e.g., second network 710); and establish a unauthenticated session 764 with the UE (e.g., UE 702) based at least in part on determining the provisioning request is for provisioning the one or more security credential parameters 772 of the UE (e.g., UE 702) to access the network (e.g., second network 710), wherein the unauthenticated session 764 comprises an EAP session for provisioning the one or more security credential parameters 772 of the UE (e.g., UE 702).

In an aspect, MME provisioning component 750 may include discovery component 752, which may be configured to broadcast messages to second network entity 706 for discovering one or more UEs (e.g., UE 702) requiring provisioning. For example, discovery component 752 may be configured to receive a provisioning procedure 776 type (PPT) and one or more PPT parameters from Registrar 124 (FIG. 1). As such, discovery component 752 may be configured to transmitting a broadcast message to one or more network entities (e.g., second network entity 706). In some instances, the broadcast message comprises the PPT and the one or more PPT parameters. Further, the broadcast messages may be transmitted as System Information Block (SIB) messages to second network entity 706, which may be received by one or more UEs (e.g., UE 702). As a result of network (e.g., Registrar 124 of FIG. 1) initiated discovery, one or more UEs (e.g., UE 702) may obtain the PPT and the one or more PPT parameters required for performing the provisioning procedure 776.

In another aspect, MME provisioning component 750 may include authentication component 754, which may be configured to determine whether a unauthenticated session 764 is established between one or more UEs (e.g., UE 702) and the second network entity 706 via communication channel 714. In some aspects, the unauthenticated session 764 may be a Radio Resource Control (RRC) connection between the UE 702 and the second network entity 706. Further, the unauthenticated session 764 provides temporary access from the second network 710 to the UE 702 for performing a provisioning procedure 776 to obtain one or more security credential parameters 772 to access the second network 710. In response to provisioning procedure 776 completing, authentication component 754 may transmit a connection release message to the second network entity 706 to release the unauthenticated session 764.

MME provisioning component 750 may include negotiation component 756, which may be configured to negotiate one or more provisioning parameters 768 with one or more UEs (e.g., UE 702). For example, negotiation component 756 may be configured to determine that a provisioning request message 770 received from one or more UEs (e.g., UE 702) comprises a request to obtain one or more security credential parameters 772 to access second network 710 using a contention based radio frequency band (e.g., a Long Term Evolution (LTE) Advanced network in a contention based radio frequency band). The provisioning request message 770 may comprise a request to establish a provisioning procedure 776 for second network 710. Further, the provisioning request message 770 may comprise a specific IMSI and APN. The provisioning request message 770 may also comprise an attach request, wherein the attach request is received over a NAS layer.

In some aspects, negotiation component 756 may transmit the provisioning request message 770 to Registrar 124 (FIG. 1) during inline provisioning over the control plane. As such, Registrar 124 (FIG. 1) determines whether to accept the request of UE 702 to establish the provisioning procedure 776. Negotiation component 756 receives a provisioning accept message 774 in response to Registrar 124 (FIG. 1) accepting the request to establish the provisioning procedure 776. As a result, negotiation component 756 may be configured to forward the provisioning accept message 774 to UE 702 indicating that the request to establish the provisioning procedure 776 has been accepted.

In another aspect, negotiation component 756 may transmit a session request message to a gateway (e.g., serving gateway 116 and/or PDN gateway 118) to establish the packet data context (e.g., create a restricted session) during inline provisioning over the data plane. For example, negotiation component 756 may be configured to determine whether the provisioning request message 770 comprises a request to obtain one or more security credential parameters 772 to access a network based at least in part on the PPT and PPT parameters along with the specific IMSI and the APN received with the provisioning request message 770. Once negotiation component 756 determines the provisioning request message 770 comprises the request, negotiation component 756 may suppress one or more security credential settings of second network 710. Suppressing one or more security credentials settings may allow UE 702 limited access to second network 710 even though UE 702 has not been provisioned with security credentials or an identity.

Moreover, negotiation component 756 may assign an APN (e.g., similar to or the same as the APN received with the provisioning request message 770) to the UE based at least in part on the provisioning request message 770. The APN indicates restricted network access for the UE during the established packet data context. Additionally, the indication of restricted network access is implicit by indicating the assigned APN. Further, negotiation component 756 may be configured to select the gateway (e.g., serving gateway 116 and/or PDN gateway 118) based at least in part on the provisioning request message 770 and the APN.

As a result, negotiation component 756 may be configured to transmit the session request message to the gateway (e.g., serving gateway 116 and/or PDN gateway 118) to establish the packet data context (e.g., create a restricted session). As such, the UE 702 may not have full access to second network 710 during the packet data context (e.g., UE 702 may not have access to the Internet via second network 710). Once the request to establish the provisioning procedure 776 has been accepted, negotiation component 756 may be configured to transmit a provisioning accept message 774 to UE 702 indicating so. Additionally, the provisioning accept message 774 may comprise additional connection information regarding how to connect with Registrar 124 (FIG. 1) to perform the provisioning procedure 776. The additional connection information may comprise an IP address of Registrar 124 (FIG. 1).

In some aspects, MME provisioning component 750 may include procedure component 758, which may be configured to perform a provisioning procedure 776 to determine the security credential parameters 772 of one or more UEs (e.g., 702) for unrestricted access to the second network 710 during inline provisioning over the control plane. For example, procedure component 758 may be configured to establish a unauthenticated session 764 with the UE based at least in part on determining the provisioning request is for provisioning the one or more security credential parameters 772 of the UE to access the network. In some instances, procedure component 758 establishes the unauthenticated session 764 in response to transmitting the provisioning accept message 774 to UE 702.

In some instances, the unauthenticated session 764 comprises an EAP session for provisioning the one or more security credential parameters 772 of the UE. Further, procedure component 758 may be configured to receiving a first generic non-access stratum transport (GNT) message comprising an EAP-over local access network (EAPOL) start request for establishing the EAP session. In response, procedure component 758 may be configured to transmit a second GNT message comprising a request for one or more identity parameters of the UE. Subsequently, procedure component 758 may be configured to receive a third GNT message comprising the one or more identity parameters in response to transmitting the second GNT message. Then, procedure component 758 may be configured to transmit a fourth GNT message comprising an indication to begin the provisioning procedure 776 to obtain the one or more security credential parameters 772 to access the network.

As a result, the provisioning procedure 776 may begin once the fourth GNT message is received by UE 702. In certain instances, the provisioning procedure 776 may be performed using at least one of an EAP, WiFi Protected Setup (WPS), and WiFi Protected Access (WPA) or WPA 2. As such, procedure component 758 may be configured to transmit one or more event messages (e.g., GNT EAP messages) to Registrar 124 (FIG. 1). Further, procedure component 758 may be configured to receive one or more corresponding response messages (e.g., GNT EAP messages) from Registrar 124 (FIG. 1). Procedure component 758 may be configured to receiving the one or more security credential parameters 772 from Registrar 124 (FIG. 1) in response to UE 702 completing the provisioning procedure 776. As a result, procedure component 758 may be configured to store the one or more security credential parameters 772 and transmit the one or more security credential parameters 772 to UE 702. In response to provisioning procedure 776 completing, authentication component 754 may transmit a connection release message to the second network entity 706 to release the unauthenticated session 764.

In additional aspects, MME provisioning component 750 may include attach component 760, which may be configured to attach to UE 702 based at least in part on the one or more security credential parameters 772. For example, once the unauthenticated session 764 is released by authentication component 754, attach component 760 may be configured to attach to UE 702 using the newly acquired security credential parameters 772 so that UE 702 has unrestricted access to second network 710.

Further, MME provisioning component 750 may include communication component 762, which may be configured to permit or otherwise enable uplink and downlink communication. For example, communication component 762 may be configured to communicate the messages to and from MME provisioning component 750 and/or its one or more components (e.g., components 752, 754, 756, 758, and 750).

Referring to FIGS. 8-11, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Figure 8:
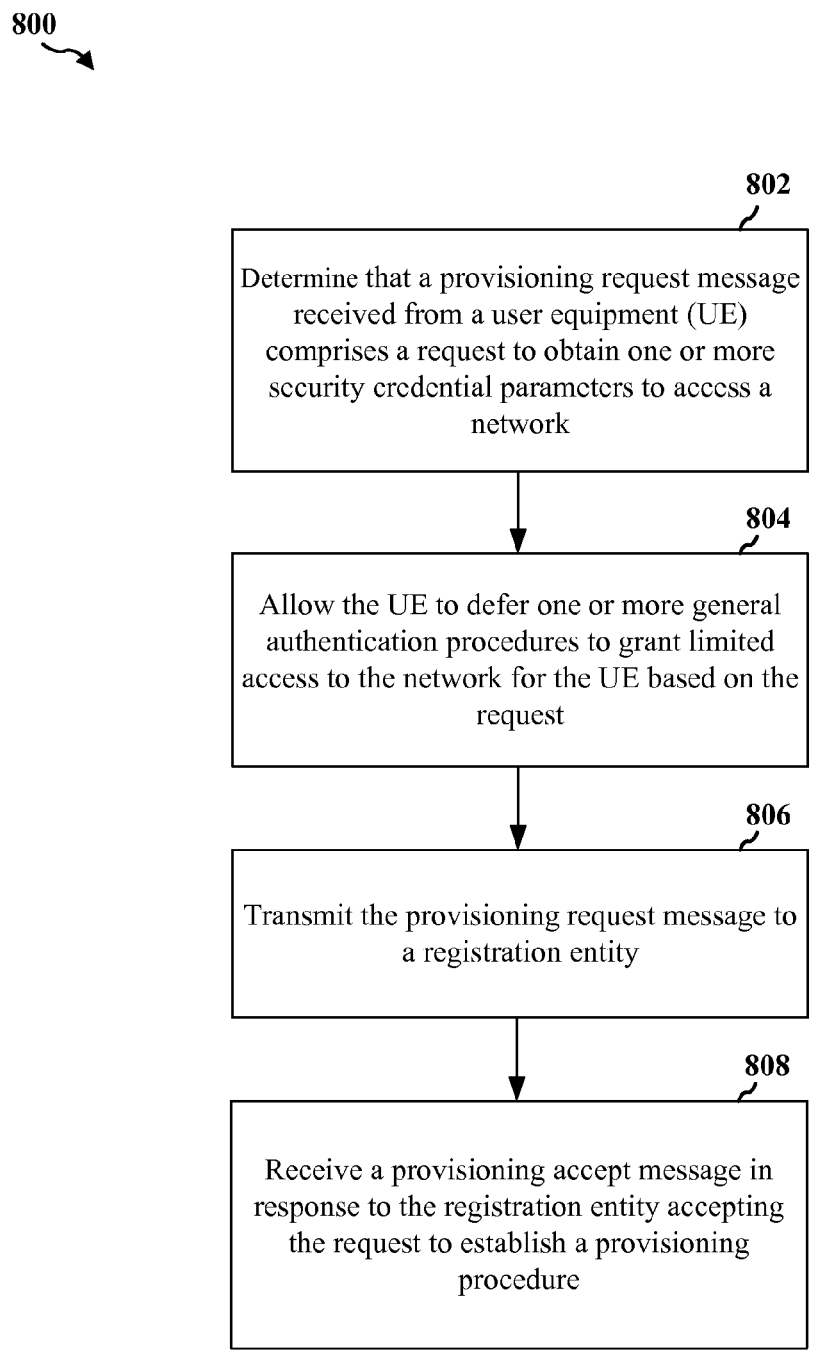
FIG. 8 is a flow chart of an aspect of the provisioning procedure according to an aspect of the present disclosure, e.g., FIG. 7.

Referring to FIG. 8, in an operational aspect, a MME such as MME 112 (FIG. 7) may perform one aspect of a method 800 for performing inline provisioning of a UE (e.g., UE 702) with access to a network (e.g., network 710) over the data plane.

At block 802, method 800 includes determining that a provisioning request message received from a UE comprises a request to obtain one or more security credential parameters to access a network using a contention based radio frequency band. For example, as described herein, MME provisioning component 750 (FIG. 7) may execute negotiation component 756 to determine that a provisioning request message 770 received from a UE (e.g., UE 702) comprises a request to obtain one or more security credential parameters 772 to access a network (e.g., second network 710). In some instances, prior to transmitting the provisioning request message 770, UE 702 may establish a Radio Resource Control (RRC) connection indicating a request for provisioning procedure 776, PPT, and PPT parameters. In certain instances, the provisioning request message 770 may comprise the request for provisioning procedure 776, PPT, and PPT parameters. The provisioning request message 770 may be transmitted using generic Non-Access Stratum (NAS) transport (e.g., as a NAS message).

Further, at block 804, method 800 includes allowing the UE to defer one or more general authentication procedures to grant limited access to the network for the UE based on the request. For example, as described herein, MME provisioning component 750 (FIG. 7) may execute authentication component 754 to allow the UE 702 to defer one or more general authentication procedures to grant limited access to the second network 710 for the UE 702 based on the request (e.g., the request to obtain one or more security credential parameters 772 to access second network 710).

At block 806, method 800 includes transmitting the provisioning request message to a registration entity. For example, as described herein, MME provisioning component 750 (FIG. 7) may execute communication component 762 to transmit the provisioning request message 770 to a registration entity (e.g., registrar 124 of FIG. 1). In some instances, the correct registration entity is selected based on the PPT provided as part of the provisioning request message 770.

At block 808, method 800 includes receiving a provisioning accept message in response to the registration entity accepting the request to establish a provisioning procedure. For example, as described herein, MME provisioning component 750 (FIG. 7) may execute communication component 762 to receive a provisioning accept message 774 in response to the registration entity (e.g., registrar 124 of FIG. 1) accepting the request to establish a provisioning procedure 776. In some instances, the registration entity determines to accept the request to establish the provisioning procedure 776. In certain instances, the registration entity determines to accept the request to establish the provisioning procedure 776 based on the PPT and PPT parameters.

In additional aspects, MME provisioning component 750 (FIG. 7) may execute communication component 762 to forward the provisioning accept message 774 to UE 702 and/or UE provisioning component 720. In some instances, the provisioning accept message 774 may be sent over NAS using generic NAS transport (e.g., as a NAS message). Further, UE 702 and/or MME 112 may determine whether a PDN connection is required, and if so, then a PDN connectivity procedure is performed to establish a connection between UE 702 and a gateway (e.g., Serving Gateway 116 and/or PDN Gateway 118 of FIG. 1). Subsequently, provisioning procedure 776 may be performed between UE 702 and a registration entity (e.g., registrar 124 of FIG. 1). Once completed the RRC connection is released and the UE 702 may execute attach component 730 to initiate an attach procedure with MME 112 and/or attach component 760 using the one or more security credential parameters 772 obtained during the provisioning procedure 776.

Figure 9:
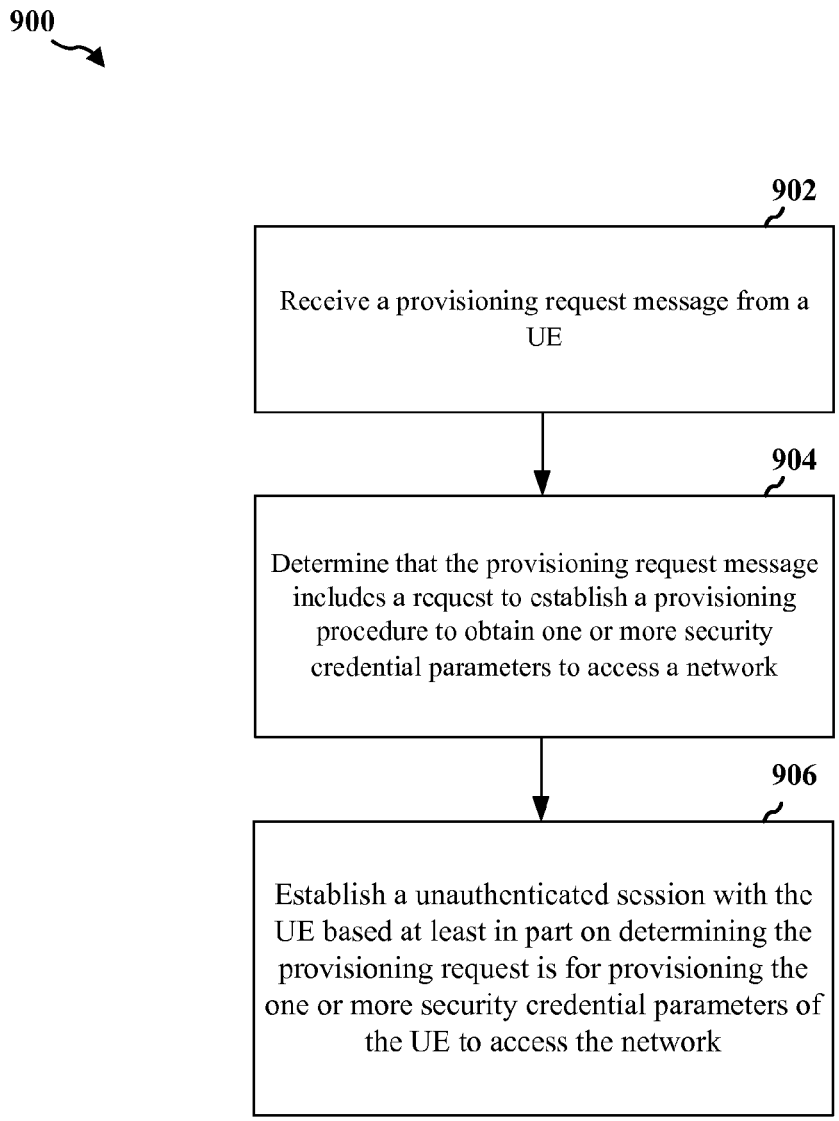
FIG. 9 is a flow chart of an aspect of the provisioning procedure according to an aspect of the present disclosure, e.g., FIG. 7.

Referring to FIG. 9, in an additional and/or operational aspect, a MME such as MME 112 (FIG. 7) may perform one aspect of a method 900 for performing inline provisioning of a UE (e.g., UE 702) with access to a network (e.g., network 710) over the control plane.

In an aspect, at block 902, method 900 includes receiving a provisioning request message from a user equipment (UE). For example, as described herein, MME provisioning component 750 (FIG. 7) may execute negotiation component 756 to receive a provisioning request message 770 from UE (e.g., UE 702). In some instances, the provisioning request message 770 may be forwarded from MME 112 to a registration entity (e.g., registrar 124 of FIG. 1). In some instances, the provisioning request message 770 may be sent over NAS using generic NAS transport (e.g., as a NAS message).

At block 904, method 900 includes determining that the provisioning request message includes a request to establish a provisioning procedure to obtain one or more security credential parameters to access a network. For example, as described herein, MME provisioning component 750 (FIG. 7) may execute negotiation component 756 to determine that the provisioning request message 770 comprises a request to establish a provisioning procedure 776 to obtain one or more security credential parameters 772 to access a network (e.g., second network 710). In some instances, the request may be a request to access the network using a contention based radio frequency band.

Further, at block 906, method 900 includes establishing a unauthenticated session with the UE based at least in part on determining the provisioning request is for provisioning the one or more security credential parameters of the UE to access the network. For example, as described herein, MME provisioning component 750 (FIG. 7) may execute procedure component 758 to establish a unauthenticated session 764 with the UE based at least in part on determining the provisioning request is for provisioning the one or more security credential parameters 772 of the UE (e.g., UE 702) to access the network (e.g., second network 710). In an aspect, the unauthenticated session 764 comprises an EAP session over NAS signaling for provisioning the one or more security credential parameters 772 of the UE. In certain instances, the MME 112 may execute procedure component 758 to communicate with UE 702 in order to receive a first generic non-access stratum transport (GNT) message comprising an EAP-over local access network (EAPOL) start request for establishing the EAP session; transmit a second GNT message comprising a request for one or more identity parameters of the UE 702; receive a third GNT message comprising the one or more identity parameters in response to transmitting the second GNT message; and transmit a fourth GNT message comprising an indication to begin the provisioning procedure 776 to obtain the one or more security credential parameters 772 to access the network. As a result, MME 112 may execute procedure component 758 to perform the provisioning procedure 776, wherein the provisioning procedure 776 is performed using at least one of a EAP, WiFi Protected Setup (WPS), and WiFi Protected Access (WPA). Moreover, the MME 112 may execute the communication component 762 to transmit one or more event messages to a registration entity (e.g., registrar 124 of FIG. 1); and to receive one or more corresponding response messages from the registration entity. As a result of the provisioning procedure 776, MME 112 may execute communication component 762 to receive the one or more security credential parameters 772 from the registration entity in response to the UE 702 completing the provisioning procedure 776. MME 112 and/or negotiation component 756 may store the one or more security credential parameters 772; and transmit the one or more security credential parameters 772 to the UE 702. As such, MME 112 may execute attach component 760 to attach to the UE 702 based at least in part on the one or more security credential parameters 772, wherein the UE 702 is attached to the network (e.g., network 710) without one or more network restrictions.

Figure 10:
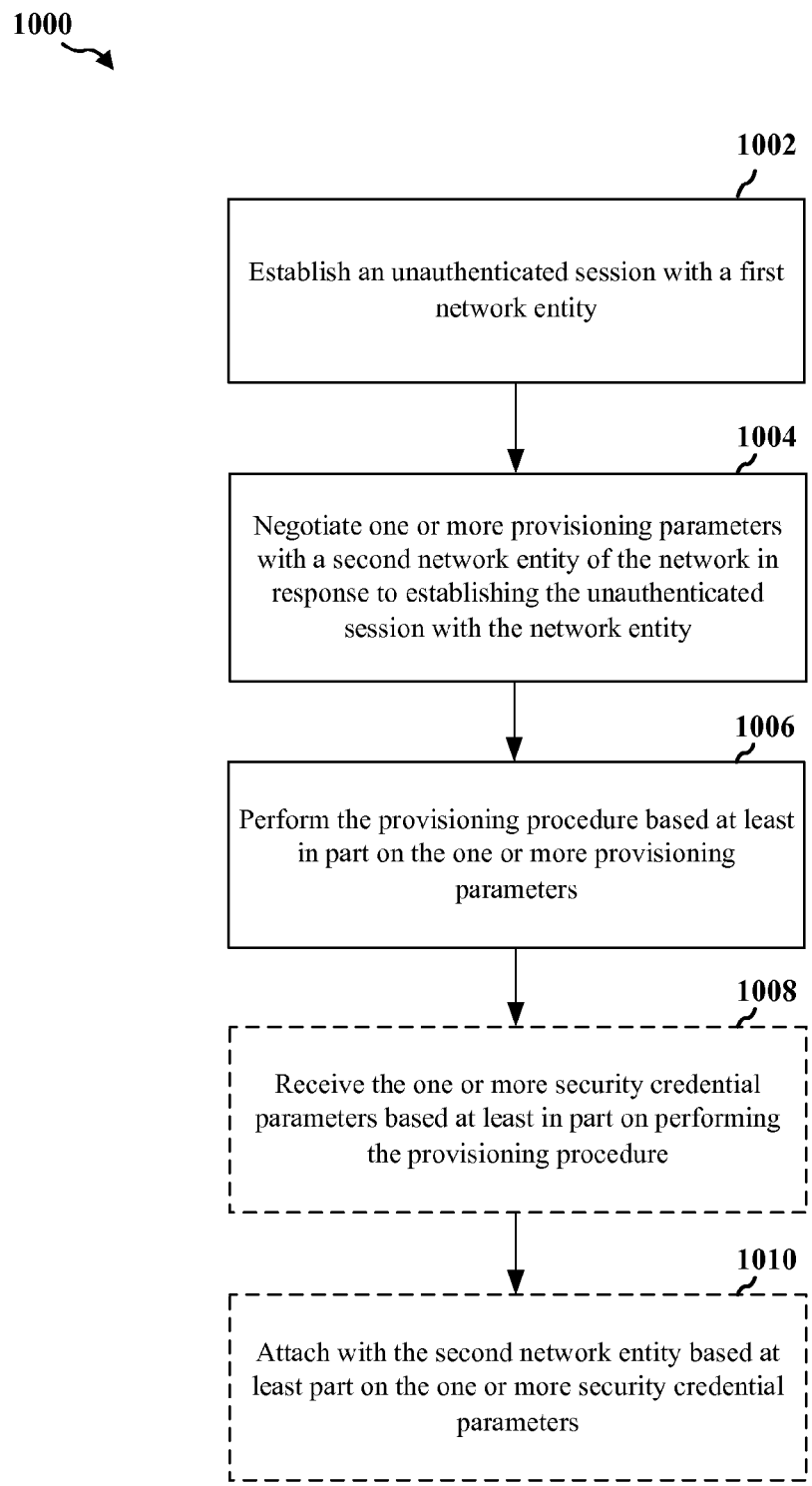
FIG. 10 is a flow chart of an aspect of the provisioning procedure according to an aspect of the present disclosure, e.g., FIG. 7.

FIG. 10, in an additional and/or alternative operational aspect, a UE such as UE 702 (FIG. 7) may perform one aspect of a method 1000 for performing inline provisioning to access a network (e.g., network 710).

In an aspect, at block 1002, method 1000 includes establishing a unauthenticated session with a first network entity. For example, as described herein, UE provisioning component 720 (FIG. 7) may execute authentication component 724 to establish a unauthenticated session 764 with a first network entity (e.g., first network entity 704). In an aspect, the unauthenticated session 764 provides temporary access to a network (e.g., second network 710) for performing a provisioning procedure 776 to obtain one or more security credential parameters 772 to access the network (e.g., second network 710).

At block 1004, method 1000 includes negotiating one or more provisioning parameters with second network entity of the network in response to establishing the unauthenticated session with the first network entity. For example, as described herein, UE provisioning component 720 (FIG. 7) may execute negotiation component 726 to negotiate one or more provisioning parameters 768 with second network entity (e.g., MME 112) of the network (e.g., second network 710) in response to establishing the unauthenticated session 764 with the first network entity (e.g., first network entity 704). In some instances, the provisioning parameters 768 may include PPT and PPT parameters.

In some aspects, negotiating the one or more provisioning parameters 768 comprises the negotiation component 726 transmitting a provisioning request to the second network entity (e.g., MME 112), wherein the provisioning request comprises a request to establish a provisioning procedure 776 for the network (e.g., second network 710). Additionally, negotiating the one or more provisioning parameters 768 comprises negotiation component 726 receiving a provisioning accept message 774 in response to the second network entity (e.g., MME 112) accepting the provisioning request.

Further, at block 1006, method 1000 includes performing the provisioning procedure based at least in part on the one or more provisioning parameters. For example, as described herein, UE provisioning component 720 (FIG. 7) may execute procedure component 728 to performing the provisioning procedure 776 based at least in part on the one or more provisioning parameters 768.

At block 1008, method 1000 may optionally include receiving the one or more security credential parameters based at least in part on performing the provisioning procedure. For example, as described herein, UE provisioning component 720 (FIG. 7) may execute procedure component 728 and/or communication component 732 to receive the one or more security credential parameters 772 based at least in part on performing the provisioning procedure 776.

At block 1010, method 1000 may optionally include attaching with the network entity based at least part on the one or more security credential parameters. For example, as described herein, UE provisioning component 720 (FIG. 7) may execute attach component 730 to attaching with the second network entity (e.g., MME 112) based at least part on the one or more security credential parameters 772. As such, the second network entity (e.g., MME 112) provides unrestricted access to the network (e.g., network 710).

Figure 11:
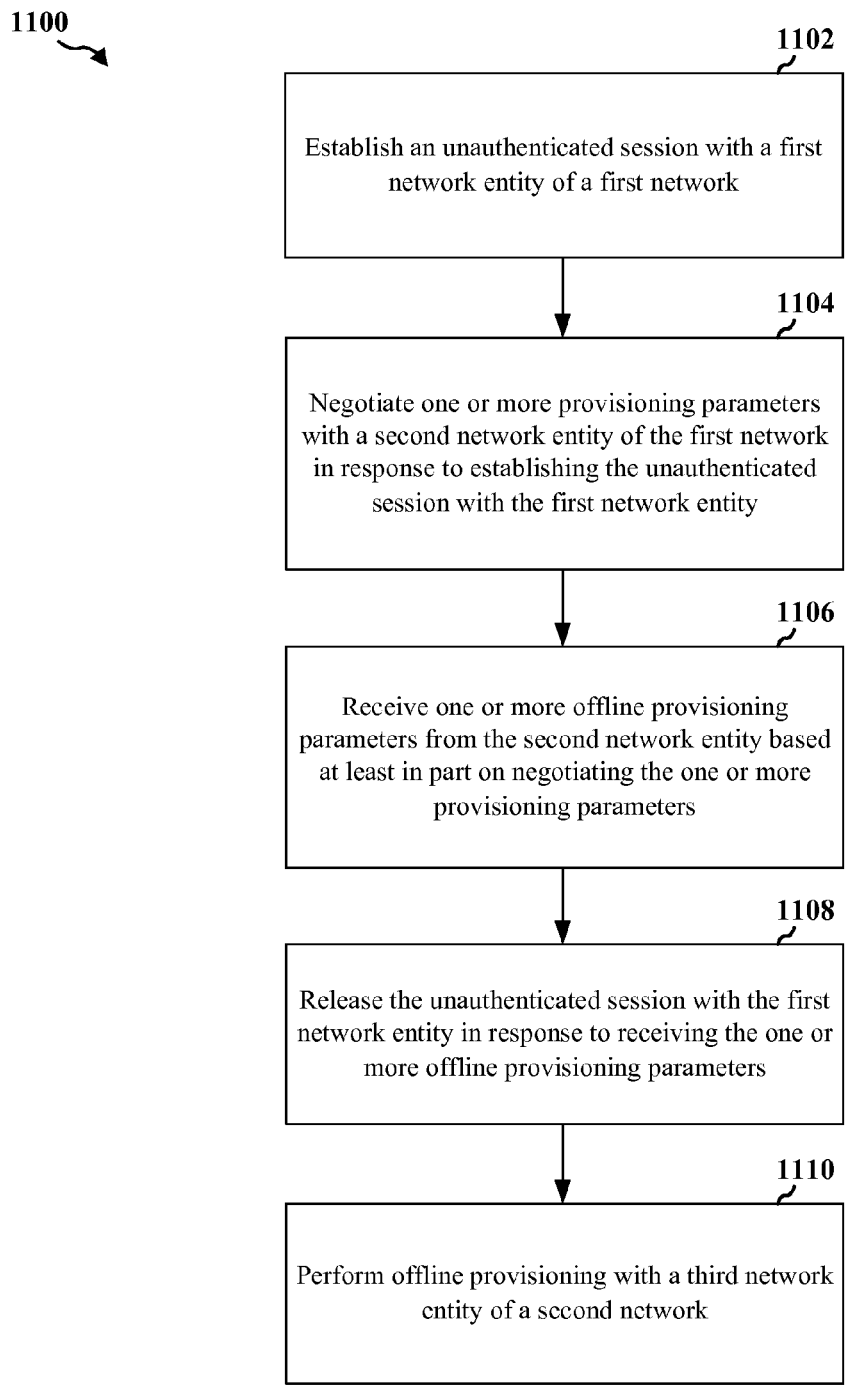
FIG. 11 is a flow chart of an aspect of the provisioning procedure according to an aspect of the present disclosure, e.g., FIG. 7.

Referring to FIG. 11, in an additional and/or alternative operational aspect, a UE such as UE 702 (FIG. 7) may perform one aspect of a method 1100 for performing offline provisioning to access a network (e.g., network 710) by provisioning via a different network (e.g., network 708).

In an aspect, at block 1102, method 1100 includes establishing a unauthenticated session with a first network entity of a first network. For example, as described herein, UE provisioning component 720 (FIG. 7) may execute authentication component 724 to establish a unauthenticated session 764 with a first network entity (e.g., second network entity 706) of a first network (e.g., second network 710). In some aspects, the unauthenticated session 764 provides temporary access to the first network (e.g., second network 710) for performing a provisioning procedure 776 to obtain one or more security credential parameters 772 to access the first network (e.g., second network 710).

At block 1104, method 1100 includes negotiating one or more provisioning parameters with a second network entity of the first network in response to establishing the unauthenticated session with the first network entity. For example, as described herein, UE provisioning component 720 (FIG. 7) may execute negotiation component 726 to negotiate one or more provisioning parameters 768 with a second network entity (e.g., MME 112) of the first network (e.g., second network 710) in response to establishing the unauthenticated session 764 with the first network entity (e.g., second network entity 706).

In some aspects, negotiating the one or more provisioning parameters 768 comprises the negotiation component 726 transmitting a provisioning request message 770 to the second network entity (e.g., MME 112), wherein the provisioning request comprises a request to establish a provisioning procedure 776 for the first network (e.g., second network 710). Additionally, negotiating the one or more provisioning parameters 768 comprises the negotiation component 726 receiving a provisioning accept message 774 in response to the second network entity (e.g., MME 112) accepting the provisioning request.

Further, at block 1106, method 1100 includes receiving one or more offline provisioning parameters from the second network entity based at least in part on negotiating the one or more provisioning parameters. For example, as described herein, UE provisioning component 720 (FIG. 7) may execute negotiation component 726 to receiving one or more offline provisioning parameters 780 from the second network entity (e.g., MME 112) based at least in part on negotiating the one or more provisioning parameters 768.

At block 1108, method 1100 includes releasing the unauthenticated session with the first network entity in response to receiving the one or more offline provisioning parameters. For example, as described herein, UE provisioning component 720 (FIG. 7) may execute unauthenticated component 724 to release the unauthenticated session 764 with the first network entity (e.g., second network entity 706) in response to receiving the one or more offline provisioning parameters 780.

In some aspects, at block 1110, method 1100 includes performing offline provisioning with a third network entity of a second network. For example, as described herein, UE provisioning component 720 (FIG. 7) may execute procedure component 728 to perform offline provisioning with a third network entity (e.g., network entity 704) of a second network (e.g., first network 708).

Figure 12:
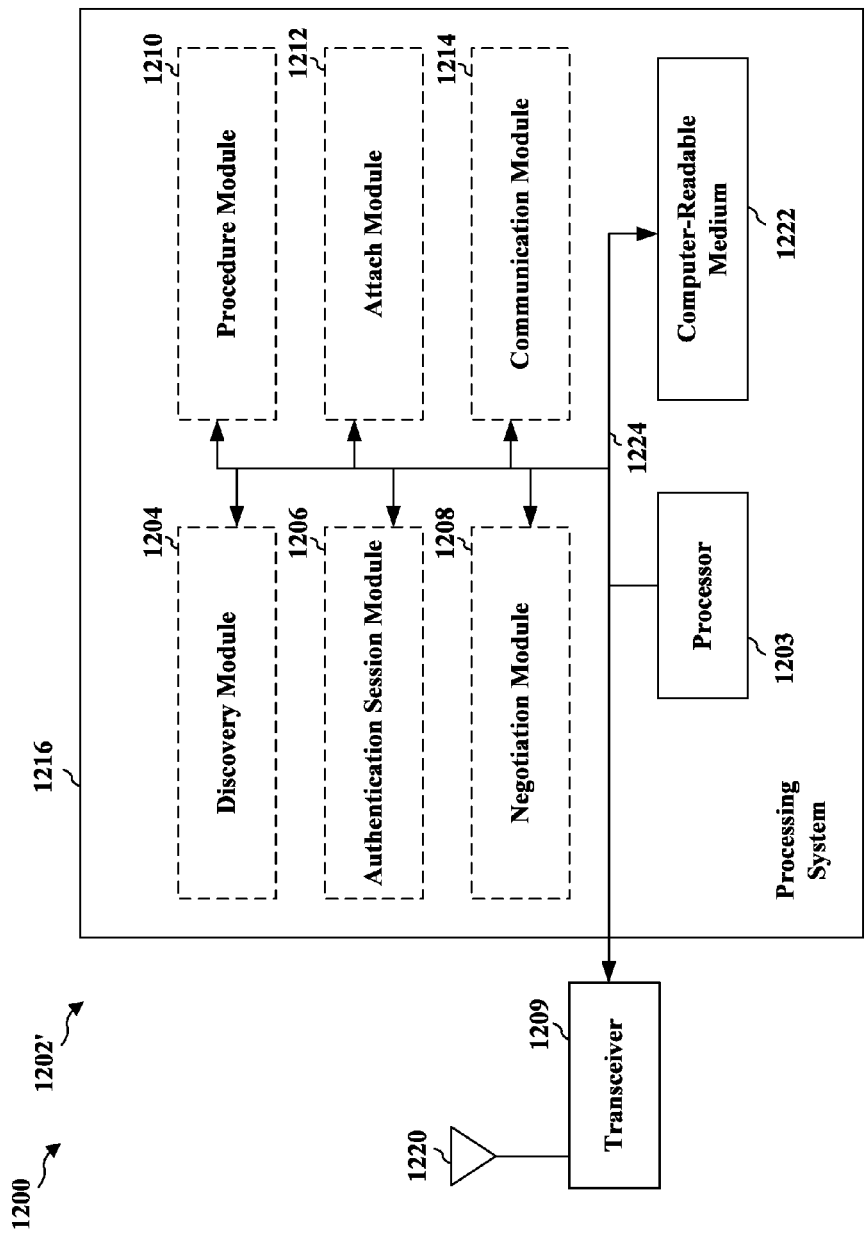
FIG. 12 is a diagram illustrating an example of a hardware implementation for an apparatus employing a processing system according to an aspect of the present disclosure.

FIG. 12 is a diagram 1200 illustrating an example of a hardware implementation for an apparatus 1202/1202' employing a processing system 1216. The processing system 1216 may be implemented with a bus architecture, represented generally by the bus 1224. The bus 1224 may include any number of interconnecting buses and bridges depending on the specific application of the processing system 1216 and the overall design constraints. The bus 1224 links together various circuits including one or more processors and/or hardware modules, represented by the processor 1203, the modules 1204, 1206, 1208, 1210, 1212, 1214, and the computer-readable medium 1222. The bus 1224 may also link various other circuits such as timing sources, peripherals, voltage regulators, and power management circuits, which are well known in the art, and therefore, will not be described any further.

The processing system 1216 may be coupled to a transceiver 1209. The transceiver 1209 is coupled to one or more antennas 1220. The transceiver 1209 provides a means for communicating with various other apparatus over a transmission medium. The processing system 1216 includes a processor 1203 coupled to a computer-readable medium 1222. The processor 1203 is responsible for general processing, including the execution of software stored on the computer-readable medium 1222. The software, when executed by the processor 1203, causes the processing system 1216 to perform the various functions described supra for any particular apparatus. The computer-readable medium 1222 may also be used for storing data that is manipulated by the processor 1203 when executing software. The processing system further includes at least one of the modules 1204, 1206, 1208, 1210, 1212, 1214. The modules may be software modules running in the processor 1203, resident/stored in the computer-readable medium 1222, one or more hardware modules coupled to the processor 1203, or some combination thereof (Include if invention resides in eNB) The processing system 1216 may be a component of the eNB 610 and may include the memory 676 and/or at least one of the TX processor 616, the RX processor 670, and the controller/processor 675. (Include if invention resides in UE) The processing system 1216 may be a component of the UE 650 and may include the memory 660 and/or at least one of the TX processor 668, the RX processor 656, and the controller/processor 659.

In one configuration, the apparatus 1202' for wireless communication includes means for determining that a provisioning request message 770 received from a user equipment (UE) comprises a request to obtain one or more security credential parameters 772 to access a network; allowing the UE to defer one or more general authentication procedures to grant limited access to the network for the UE based on the request; transmitting the provisioning request message 770 to a registration entity; and receiving a provisioning accept message 774 in response to the registration entity accepting the request to establish a provisioning procedure 776. Moreover, the apparatus 1202' for wireless communication includes means for receiving a provisioning request message 770 from a user equipment (UE); determining that the provisioning request message 770 comprises a request to establish a provisioning procedure 776 to obtain one or more security credential parameters 772 to access a network; and establishing a unauthenticated session 764 with the UE based at least in part on determining the provisioning request is for provisioning the one or more security credential parameters 772 of the UE to access the network, wherein the unauthenticated session 764 comprises an Extensible Authentication Protocol (EAP) session over NAS signaling for provisioning the one or more security credential parameters 772 of the UE. The aforementioned means may be one or more of the aforementioned modules of the apparatus 1202' and/or the processing system 1216 of the apparatus 1202' configured to perform the functions recited by the aforementioned means. As described supra, the processing system 1216 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In one configuration, the apparatus 1202 for wireless communication includes means for establishing a unauthenticated session 764 with a first network entity, wherein the unauthenticated session 764 provides temporary access to a network for performing a provisioning procedure 776 to obtain one or more security credential parameters 772 to access the network; negotiating one or more provisioning parameters 768 with second network entity of the network in response to establishing the unauthenticated session 764 with the first network entity; and performing the provisioning procedure 776 based at least in part on the one or more provisioning parameters 768. Further, the apparatus 1202 for wireless communication includes means for establishing a unauthenticated session 764 with a first network entity of a first network, wherein the unauthenticated session 764 provides temporary access to the first network for performing a provisioning procedure 776 to obtain one or more security credential parameters 772 to access the first network; negotiating one or more provisioning parameters 768 with a second network entity of the first network in response to establishing the unauthenticated session 764 with the first network entity; receiving one or more offline provisioning parameters 780 from the second network entity based at least in part on negotiating the one or more provisioning parameters 768; releasing the unauthenticated session 764 with the first network entity in response to receiving the one or more offline provisioning parameters 780; and performing offline provisioning with a third network entity of a second network; wherein the offline provisioning comprises receiving one or more security credential parameters 772 for providing secure access to the first network, wherein the one or more security credential parameters 772 provide unrestricted access to the first network. The aforementioned means may be one or more of the aforementioned modules of the apparatus 1202 and/or the processing system 1216 of the apparatus 1202 configured to perform the functions recited by the aforementioned means. As described supra, the processing system 1216 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   receiving a provisioning request message from a user equipment (UE) after the UE establishes a Radio Resource Control (RRC) connection, wherein the provisioning request message indicates a provisioning procedure type (PPT) and one or more PPT parameters;
   determining that the provisioning request message received from the UE comprises a request to obtain one or more security credential parameters to access a network;
   allowing the UE to defer one or more general authentication procedures to grant limited access to the network for the UE based on the request;
   transmitting the provisioning request message to a registration entity; and
   receiving a provisioning accept message in response to the registration entity accepting the request to establish a provisioning procedure, wherein the registration entity determines to accept the request to establish the provisioning procedure based on the PPT and the one or more PPT parameters.

2. The method of claim 1, further comprising transmitting a session request message to a gateway to establish a packet data context to obtain one or more security credential parameters.

3. The method of claim 2, further comprising receiving the one or more security credential parameters from the registration entity.

4. The method of claim 3, further comprising attaching to the UE based at least in part on the one or more security credential parameters, wherein the UE is attached to the network.

5. The method of claim 2, further comprising selecting the gateway based at least in part on the provisioning request message.

6. The method of claim 5, wherein selecting the gateway is further based at least in part on the PPT and the one or more PPT parameters.

7. The method of claim 1, wherein accepting the request to establish the provisioning procedure comprises transmitting an internet protocol (IP) address of the registration entity to the UE.

8. The method of claim 1, wherein the provisioning request message further comprises an attach request, wherein the attach request is received over a non-access stratum (NAS) layer.

9. The method of claim 1, wherein the provisioning request message further comprises the PPT and the one or more PPT parameters.

10. The method of claim 1, wherein the provisioning request message further comprises one or both of an access point name (APN) and an international mobile security identity (IMSI) of the UE.

11. The method of claim 1, further comprising:
    receiving the PPT and the one or more PPT parameters from the registration entity; and
    transmitting a broadcast message to one or more network entities, wherein the broadcast message comprises the PPT and the one or more PPT parameters.

12. The method of claim 11, wherein the broadcast message comprises a System Information Block (SIB) message.

13. The method of claim 1, further comprising assigning an access point name (APN) to the UE based at least in part on the provisioning request message, wherein the APN indicates restricted network access for the UE.

14. The method of claim 1, wherein determining that the provisioning request message comprises the request is based at least in part on one or both of an international mobile security identity (IMSI) of the UE and an access point name (APN).

15. The method of claim 2, wherein the session request message indicates that the packet data context is restricted to provisioning the one or more security credential parameters of the UE to access the network.

16. The method of claim 1, wherein the network uses a contention based radio frequency band.

17. A non-transitory computer-readable medium storing computer executable code for wireless communication, comprising:
    code for receiving a provisioning request message from a user equipment (UE) after the UE establishes a Radio Resource Control (RRC) connection, wherein the provisioning request message indicates a provisioning procedure type (PPT) and one or more PPT parameters;
    code for determining that the provisioning request message received from the UE comprises a request to obtain one or more security credential parameters to access a network;
    code for allowing the UE to defer one or more general authentication procedures to grant limited access to the network for the UE based on the request;
    code for transmitting the provisioning request message to a registration entity; and
    code for receiving a provisioning accept message in response to the registration entity accepting the request to establish a provisioning procedure, wherein the registration entity determines to accept the request to establish the provisioning procedure based on the PPT and the one or more PPT parameters.

18. An apparatus for wireless communication, comprising:
    means for receiving a provisioning request message from a user equipment (UE) after the UE establishes a Radio Resource Control (RRC) connection, wherein the provisioning request message indicates a provisioning procedure type (PPT) and one or more PPT parameters;
    means for determining that the provisioning request message received from the UE comprises a request to obtain one or more security credential parameters to access a network;
    means for allowing the UE to defer one or more general authentication procedures to grant limited access to the network for the UE based on the request;
    means for transmitting the provisioning request message to a registration entity; and
    means for receiving a provisioning accept message in response to the registration entity accepting the request to establish a provisioning procedure, wherein the registration entity determines to accept the request to establish the provisioning procedure based on the PPT and the one or more PPT parameters.

19. An apparatus for wireless communication, comprising:
a communication component configured to receive a provisioning request message from a user equipment (UE) after the UE establishes a Radio Resource Control (RRC) connection, wherein the provisioning request message indicates a provisioning procedure type (PPT) and one or more PPT parameters;
a negotiation component configured to determine that the provisioning request message received from the UE comprises a request to obtain one or more security credential parameters to access a network;
an authentication component configured to allow the UE to defer one or more general authentication procedures to grant limited access to the network for the UE based on the request; and
wherein the communication component is further configured to transmit the provisioning request message to a registration entity,
wherein the communication component is further configured to receive a provisioning accept message in response to the registration entity accepting the request to establish a provisioning procedure, wherein the registration entity determines to accept the request to establish the provisioning procedure based on the PPT and the one or more PPT parameters.

20. The apparatus of claim 19, wherein the communication component is further configured to transmit a session request message to a gateway to establish a packet data context to obtain one or more security credential parameters.

21. The apparatus of claim 20, wherein the communication component is further configured to receive the one or more security credential parameters from the registration entity.

22. The apparatus of claim 21, further comprising an attach component configured to the UE based at least in part on the one or more security credential parameters, wherein the UE is attached to the network.

23. The apparatus of claim 20, wherein the negotiation component is further configured to select the gateway based at least in part on the provisioning request message.

24. The apparatus of claim 23, wherein the negotiation component is further configured to select the gateway based at least in part on the PPT and the one or more PPT parameters.

25. The apparatus of claim 19, wherein accepting the request to establish the provisioning procedure comprises transmitting an internet protocol (IP) address of the registration entity to the UE.

26. The apparatus of claim 19, wherein the provisioning request message further comprises an attach request, wherein the attach request is received over a non-access stratum (NAS) layer.

27. The apparatus of claim 19, wherein the provisioning request message further comprises the PPT and the one or more PPT parameters.

28. The apparatus of claim 19, wherein the provisioning request message further comprises one or both of an access point name (APN) and an international mobile security identity (IMSI) of the UE.

29. The apparatus of claim 19, wherein the communication component is further configured to receive the PPT and one or more PPT parameters from the registration entity, and transmit a broadcast message to one or more network entities, wherein the broadcast message comprises the PPT and the one or more PPT parameters.

30. The apparatus of claim 29, wherein the broadcast message comprises a System Information Block (SIB) message.

31. The apparatus of claim 19, wherein the negotiation component is further configured to assigning an access point name (APN) to the UE based at least in part on the provisioning request message, wherein the APN indicates restricted network access for the UE.

32. The apparatus of claim 19, wherein the negotiation component is configured to determining that the provisioning request message based at least in part on one or both of an international mobile security identity (IMSI) of the UE and an access point name (APN).

33. The apparatus of claim 20, wherein the session request message indicates that the packet data context is restricted to provisioning the one or more security credential parameters of the UE to access the network.

34. The apparatus of claim 19, wherein the network uses a contention based radio frequency band.

35. A method for wireless communication, comprising:
receiving a provisioning request message from a user equipment (UE);
determining that the provisioning request message comprises a request to establish a provisioning procedure to obtain one or more security credential parameters to access a network; and
establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

36. The method of claim 35, wherein establishing the unauthenticated session with the UE further comprises:
receiving a first generic non-access stratum transport (GNT) message comprising an EAP-over local access network (EAPOL) start request for establishing the EAP session;
transmitting a second GNT message comprising a request for one or more identity parameters of the UE;
receiving a third GNT message comprising the one or more identity parameters in response to transmitting the second GNT message; and
transmitting a fourth GNT message comprising an indication to begin the provisioning procedure to obtain the one or more security credential parameters to access the network.

37. The method of claim 36, further comprising performing the provisioning procedure, wherein the provisioning procedure is performed using at least one of a EAP, WiFi Protected Setup (WPS), and WiFi Protected Access (WPA).

38. The method of claim 37, wherein the provisioning procedure further comprises:
transmitting one or more event messages to a registration entity; and
receiving one or more corresponding response messages from the registration entity.

39. The method of claim 37, wherein the provisioning procedure further comprises:
receiving the one or more security credential parameters from the registration entity in response to the UE completing the provisioning procedure;
storing the one or more security credential parameters; and
transmitting the one or more security credential parameters to the UE.

40. The method of claim 37, further comprising:
attaching to the UE based at least in part on the one or more security credential parameters, wherein the UE is attached to the network without one or more network restrictions.

41. The method of claim 35, further comprising:
transmitting the provisioning request message to a registration entity, wherein the registration entity determines whether to accept the request to establish the provisioning procedure; and
receiving a provisioning accept message in response to the registration entity accepting the request to establish the provisioning procedure.

42. The method of claim 41, wherein establishing the unauthenticated session with the UE is based at least in part on receiving the provisioning accept message.

43. The method of claim 35, further comprising:
receiving a provisioning procedure type (PPT) and one or more PPT parameters from a registration entity; and
transmitting a broadcast message to one or more network entities, wherein the broadcast message comprises the PPT and the one or more PPT parameters.

44. The method of claim 43, wherein the broadcast message comprises a System Information Block (SIB) message.

45. The method of claim 35, wherein the provisioning request message further comprises an attach request, wherein the attach request is received over the NAS layer.

46. The method of claim 35, wherein the provisioning request message further comprises a provisioning procedure type (PPT) and one or more PPT parameters.

47. The method of claim 35, wherein receiving the provisioning request message from the UE comprises receiving the provisioning request message after the UE establishes a Radio Resource Control (RRC) connection, wherein the RRC connection is established based at least in part on a provisioning procedure type (PPT) and one or more PPT parameters.

48. The method of claim 35, wherein the network uses a contention based radio frequency band.

49. A non-transitory computer-readable medium storing computer executable code for wireless communication, comprising:
code for receiving a provisioning request message from a user equipment (UE);
code for determining that the provisioning request message comprises a request to establish a provisioning procedure to obtain one or more security credential parameters to access a network; and
code for establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

50. An apparatus for wireless communication, comprising:
means for receiving a provisioning request message from a user equipment (UE);
means for determining that the provisioning request message comprises a request to establish a provisioning procedure to obtain one or more security credential parameters to access a network; and
means for establishing a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

51. An apparatus for wireless communication, comprising:
a communication component configured to receive a provisioning request message from a user equipment (UE);
a negotiation component configured to determine that the provisioning request message comprises a request to establish a provisioning procedure to obtain one or more security credential parameters to access a network; and
an authentication component configured to establish a unauthenticated session with the UE based at least in part on determining the provisioning request is for provisioning the one or more security credential parameters of the UE to access the network, wherein the unauthenticated session comprises an Extensible Authentication Protocol (EAP) session over non-access stratum (NAS) signaling for provisioning the one or more security credential parameters of the UE.

52. The apparatus of claim 51, wherein the authentication component is further configured to:
receive a first generic non-access stratum transport (GNT) message comprising an EAP-over local access network (EAPOL) start request for establishing the EAP session;
transmit a second GNT message comprising a request for one or more identity parameters of the UE;
receive a third GNT message comprising the one or more identity parameters in response to transmitting the second GNT message; and
transmit a fourth GNT message comprising an indication to begin the provisioning procedure to obtain the one or more security credential parameters to access the network.

53. The apparatus of claim 52, further comprising a procedure component configured to perform the provisioning procedure, wherein the provisioning procedure is performed using at least one of a EAP, WiFi Protected Setup (WPS), and WiFi Protected Access (WPA).

54. The apparatus of claim 53, wherein the communication component is further configured to:
transmit one or more event messages to a registration entity; and
receive one or more corresponding response messages from the registration entity.

55. The apparatus of claim 53, wherein the communication component is further configured to:
receive the one or more security credential parameters from the registration entity in response to the UE completing the provisioning procedure;
store the one or more security credential parameters; and
transmit the one or more security credential parameters to the UE.

56. The apparatus of claim 53, further comprising an attach component configured to attach to the UE based at least in part on the one or more security credential parameters, wherein the UE is attached to the network without one or more network restrictions.

57. The apparatus of claim 51, wherein the communication component is further configured to:
transmit the provisioning request message to a registration entity, wherein the registration entity determines whether to accept the request to establish the provisioning procedure; and receive a provisioning accept message in response to the registration entity accepting the request to establish the provisioning procedure.

58. The apparatus of claim 57, wherein the authentication component is configured to establish the unauthenticated session with the UE based at least in part on receiving the provisioning accept message.

59. The apparatus of claim 51, wherein the communication component is further configured to:
receive a provisioning procedure type (PPT) and one or more PPT parameters from a registration entity; and
transmit a broadcast message to one or more network entities, wherein the broadcast message comprises the PPT and the one or more PPT parameters.

60. The apparatus of claim 59, wherein the broadcast message comprises a System Information Block (SIB) message.

61. The apparatus of claim 51, wherein the provisioning request message further comprises an attach request, wherein the attach request is received over the NAS layer.

62. The apparatus of claim 51, wherein the provisioning request message further comprises a provisioning procedure type (PPT) and one or more PPT parameters.

63. The apparatus of claim 51, wherein the communication component is further configured to receive the provisioning request message from the UE after the UE establishes a Radio Resource Control (RRC) connection, wherein the RRC connection is established based at least in part on a provisioning procedure type (PPT) and one or more PPT parameters.

64. The apparatus of claim 51, wherein the network uses a contention based radio frequency band.

65. A method of wireless communication, comprising:
establishing a unauthenticated session with a first network entity, wherein the unauthenticated session provides temporary access to a network for performing a provisioning procedure to obtain one or more security credential parameters to access the network, the unauthenticated session including a Radio Resource Control (RRC) connection;
negotiating one or more provisioning parameters including a provisioning procedure type (PPT) and one or more PPT parameters with second network entity of the network in response to establishing the unauthenticated session with the first network entity; and
performing the provisioning procedure based at least in part on the one or more provisioning parameters.

66. The method of claim 65, further comprising receiving the one or more security credential parameters based at least in part on performing the provisioning procedure, wherein the one or more security credential parameters provide unrestricted access to the network.

67. The method of claim 66, further comprising:
releasing the unauthenticated session with the first network entity in response to receiving the one or more security credential parameters; and
attaching with the second network entity based at least part on the one or more security credential parameters, wherein the second network entity provides unrestricted access to the network.

68. The method of claim 65, wherein negotiating the one or more provisioning parameters comprises:
transmitting a provisioning request message to the second network entity, wherein the provisioning request comprises a request to establish a provisioning procedure for the network; and
receiving a provisioning accept message in response to the second network entity accepting the provisioning request.

69. The method of claim 66, further comprising storing the one or more security credential parameters.

70. The method of claim 65, further comprising:
determining whether the provisioning procedure requires a packet data network (PDN) connection; and
establishing the PDN connection.

71. The method of claim 68, wherein the provisioning request message further comprises an attach request, wherein the attach request is received over a non-access stratum (NAS) layer.

72. The method of claim 68, wherein the provisioning request message further comprises the PPT and the one or more PPT parameters.

73. The method of claim 65, further comprising:
scanning one or more networks;
determining that at least one of the one or more networks is available for provisioning; and
selecting the one of the one or more networks, wherein the PPT and the one or more PPT parameters are provided for the one of the one or more networks selected.

74. The method of claim 65, further comprising:
receiving one or more broadcast messages, wherein the one or more broadcast messages comprise the PPT and the one or more PPT parameters for one or more networks;
selecting one of the one or more networks.

75. The method of claim 74, wherein the one or more broadcast messages comprise one or more System Information Block (SIB) messages.

76. The method of claim 65, wherein the network uses a contention based radio frequency band.

77. A non-transitory computer-readable medium storing computer executable code for wireless communication, comprising:
code for establishing a unauthenticated session with a first network entity, wherein the unauthenticated session provides temporary access to a network for performing a provisioning procedure to obtain one or more security credential parameters to access the network, the unauthenticated session including a Radio Resource Control (RRC) connection;
code for negotiating one or more provisioning parameters including a provisioning procedure type (PPT) and one or more PPT parameters with second network entity of the network in response to establishing the unauthenticated session with the first network entity; and
code for performing the provisioning procedure based at least in part on the one or more provisioning parameters.

78. An apparatus for wireless communication, comprising:
means for establishing a unauthenticated session with a first network entity, wherein the unauthenticated session provides temporary access to a network for performing a provisioning procedure to obtain one or more security credential parameters to access the network, the unauthenticated session including a Radio Resource Control (RRC) connection;
means for negotiating one or more provisioning parameters including a provisioning procedure type (PPT) and one or more PPT parameters with second network entity of the network in response to establishing the unauthenticated session with the first network entity; and
means for performing the provisioning procedure based at least in part on the one or more provisioning parameters.

79. An apparatus for wireless communication, comprising:
an authentication component configured to establish a unauthenticated session with a first network entity, wherein the unauthenticated session provides temporary access to a network for performing a provisioning procedure to obtain one or more security credential parameters to access the network, the unauthenticated session including a Radio Resource Control (RRC) connection;

a negotiation component configured to negotiate one or more provisioning parameters including a provisioning procedure type (PPT) and one or more PPT parameters with second network entity of the network in response to establishing the unauthenticated session with the first network entity; and a procedure component configured to perform the provisioning procedure based at least in part on the one or more provisioning parameters.

80. The apparatus of claim 79, further comprising a communication component configured to receive the one or more security credential parameters based at least in part on performing the provisioning procedure, wherein the one or more security credential parameters provide unrestricted access to the network.

81. The apparatus of claim 80, wherein the unauthenticated component is further configured to release the unauthenticated session with the first network entity in response to receiving the one or more security credential parameters; and an attach component configured to attach with the second network entity based at least part on the one or more security credential parameters, wherein the second network entity provides unrestricted access to the network.

82. The apparatus of claim 79, wherein a communication component is configured to:

transmit a provisioning request message to the second network entity, wherein the provisioning request comprises a request to establish a provisioning procedure for the network; and receive a provisioning accept message in response to the second network entity accepting the provisioning request.

83. The apparatus of claim 80, wherein the procedure component is further configured to store the one or more security credential parameters.

84. The apparatus of claim 79, wherein the procedure component is further configured to:

determine whether the provisioning procedure requires a packet data network (PDN) connection; and establish the PDN connection.

85. The apparatus of claim 82, wherein the provisioning request message further comprises an attach request, wherein the attach request is received over a non-access stratum (NAS) layer.

86. The apparatus of claim 82, wherein the provisioning request message further comprises the PPT and the one or more PPT parameters.

87. The apparatus of claim 79, further comprising a discovery component configured to:

scan one or more networks;

determine that at least one of the one or more networks is available for provisioning; and select the one of the one or more networks, wherein the PPT and the one or more PPT parameters are provided for the one of the one or more networks selected.

88. The apparatus of claim 79, further comprising a discovery component configured to:

receiving one or more broadcast messages, wherein the one or more broadcast messages comprise the PPT and the one or more PPT parameters for one or more networks;

selecting one of the one or more networks.

89. The apparatus of claim 88, wherein the one or more broadcast messages comprise one or more System Information Block (SIB) messages.

90. The apparatus of claim 79, wherein the network uses a contention based radio frequency band.

91. A method of wireless communication, comprising:

establishing a unauthenticated session with a first network entity of a first network, wherein the unauthenticated session provides temporary access to the first network for performing a provisioning procedure to obtain one or more security credential parameters to access the first network;

negotiating one or more provisioning parameters with a second network entity of the first network in response to establishing the unauthenticated session with the first network entity;

receiving one or more offline provisioning parameters from the second network entity based at least in part on negotiating the one or more provisioning parameters;

releasing the unauthenticated session with the first network entity in response to receiving the one or more offline provisioning parameters; and performing offline provisioning with a third network entity of a second network; wherein the offline provisioning comprises receiving one or more security credential parameters for providing secure access to the first network, wherein the one or more security credential parameters provide unrestricted access to the first network.

92. The method of claim 91, wherein the unauthenticated session comprises a Radio Resource Control (RRC) connection, wherein the RRC connection is established based at least in part on a provisioning procedure type (PPT) and one or more PPT parameters.

93. The method of claim 91, wherein negotiating the one or more provisioning parameters comprises:

transmitting a provisioning request message to the second network entity, wherein the provisioning request message comprises a request to establish a provisioning procedure for the network; and receiving a provisioning accept message in response to the second network entity accepting the provisioning request.

94. The method of claim 91, further comprising storing the one or more security credential parameters.

95. The method of claim 91, further comprising:

scanning one or more networks;

determining that at least one of the one or more networks is available for provisioning; and selecting the one of the one or more networks, wherein a provisioning procedure type (PPT) and one or more PPT parameters are provided for the one of the one or more networks selected.

96. The method of claim 91, further comprising:

receiving one or more broadcast messages, wherein the one or more broadcast messages comprise a provisioning procedure type (PPT) and one or more PPT parameters for one or more networks;

selecting one of the one or more networks.

97. The method of claim 96, wherein the one or more broadcast messages comprise one or more System Information Block (SIB) messages.

98. The method of claim 93, wherein the provisioning request further comprises an attach request, wherein the attach request is received over a non-access stratum (NAS) layer.

99. The method of claim 93, wherein the provisioning request message further comprises a provisioning procedure type (PPT) and one or more PPT parameters.

100. The method of claim 91, further comprising:
determining whether the provisioning procedure requires a packet data network (PDN) connection; and
establishing the PDN connection.

101. The method of claim 91, wherein the first network uses a contention based radio frequency band.

102. A non-transitory computer-readable medium storing computer executable code for wireless communication, comprising:
code for establishing a unauthenticated session with a first network entity of a first network, wherein the unauthenticated session provides temporary access to the first network for performing a provisioning procedure to obtain one or more security credential parameters to access the first network;
code for negotiating one or more provisioning parameters with a second network entity of the first network in response to establishing the unauthenticated session with the first network entity;
code for receiving one or more offline provisioning parameters from the second network entity based at least in part on negotiating the one or more provisioning parameters;
code for releasing the unauthenticated session with the first network entity in response to receiving the one or more offline provisioning parameters; and
code for performing offline provisioning with a third network entity of a second network;
wherein the offline provisioning comprises receiving one or more security credential parameters for providing secure access to the first network, wherein the one or more security credential parameters provide unrestricted access to the first network.

103. An apparatus for wireless communication, comprising:
means for establishing a unauthenticated session with a first network entity of a first network, wherein the unauthenticated session provides temporary access to the first network for performing a provisioning procedure to obtain one or more security credential parameters to access the first network;
means for negotiating one or more provisioning parameters with a second network entity of the first network in response to establishing the unauthenticated session with the first network entity;
means for receiving one or more offline provisioning parameters from the second network entity based at least in part on negotiating the one or more provisioning parameters;
means for releasing the unauthenticated session with the first network entity in response to receiving the one or more offline provisioning parameters; and
means for performing offline provisioning with a third network entity of a second network; wherein the offline provisioning comprises receiving one or more security credential parameters for providing secure access to the first network, wherein the one or more security credential parameters provide unrestricted access to the first network.

104. An apparatus for wireless communication, comprising:
an authentication component configured to establish a unauthenticated session with a first network entity of a first network, wherein the unauthenticated session provides temporary access to the first network for performing a provisioning procedure to obtain one or more security credential parameters to access the first network;
a negotiation component configured to negotiate one or more provisioning parameters with a second network entity of the first network in response to establishing the unauthenticated session with the first network entity;
a communication component configured to receive one or more offline provisioning parameters from the second network entity based at least in part on negotiating the one or more provisioning parameters;
wherein the authentication component is further configured to release the unauthenticated session with the first network entity in response to receiving the one or more offline provisioning parameters; and
a procedure component configured to perform offline provisioning with a third network entity of a second network; wherein the offline provisioning comprises receiving one or more security credential parameters for providing secure access to the first network, wherein the one or more security credential parameters provide unrestricted access to the first network.

105. The apparatus of claim 104, wherein the unauthenticated session comprises a Radio Resource Control (RRC) connection, wherein the RRC connection is established based at least in part on a provisioning procedure type (PPT) and one or more PPT parameters.

106. The apparatus of claim 104, wherein the negotiation component is further configured to:
transmit a provisioning request message to the second network entity, wherein the provisioning request message comprises a request to establish a provisioning procedure for the network; and
receive a provisioning accept message in response to the second network entity accepting the provisioning request.

107. The apparatus of claim 104, wherein the procedure component is further configured to store the one or more security credential parameters.

108. The apparatus of claim 104, further comprising a discovery component configured to:
scan one or more networks;
determine that at least one of the one or more networks is available for provisioning; and
select the one of the one or more networks, wherein a provisioning procedure type (PPT) and one or more PPT parameters are provided for the one of the one or more networks selected.

109. The apparatus of claim 104, further comprising a discovery component configured to:
receive one or more broadcast messages, wherein the one or more broadcast messages comprise a provisioning procedure type (PPT) and one or more PPT parameters for one or more networks;
select one of the one or more networks.

110. The apparatus of claim 109, wherein the one or more broadcast messages comprise one or more System Information Block (SIB) messages.

111. The apparatus of claim 106, wherein the provisioning request further comprises an attach request, wherein the attach request is received over a non-access stratum (NAS) layer.

112. The apparatus of claim 106, wherein the provisioning request message further comprises a provisioning procedure type (PPT) and one or more PPT parameters.

113. The apparatus of claim 104, wherein the procedure component is further configured to:
determine whether the provisioning procedure requires a packet data network (PDN) connection; and
establish the PDN connection.

114. The apparatus of claim 104, wherein the first network uses a contention based radio frequency band.

\* \* \* \* \*